(12) United States Patent
Yamanaka et al.

(10) Patent No.: US 8,445,628 B2
(45) Date of Patent: May 21, 2013

(54) COPOLYMER RESIN COMPOSITION, MOLDED PRODUCT, AND METHOD OF MANUFACTURING A COPOLYMER RESIN COMPOSITION

(75) Inventors: Yasuo Yamanaka, Tokyo (JP); Tadakatsu Harada, Kanagawa (JP); Hidekazu Yaginuma, Kanagawa (JP); Masanobu Munekata, Hokkaido (JP); Kenji Tajima, Hokkaido (JP); Yasuharu Satoh, Hokkaido (JP); Tokuo Matsushima, Hokkaido (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/827,079

(22) Filed: Jun. 30, 2010

(65) Prior Publication Data

US 2011/0003919 A1   Jan. 6, 2011

(30) Foreign Application Priority Data

Jul. 6, 2009  (JP) .................. 2009-159981
Jul. 6, 2009  (JP) .................. 2009-159982
Mar. 9, 2010  (JP) .................. 2010-052398

(51) Int. Cl.
  *C08G 63/08*  (2006.01)
(52) U.S. Cl.
  USPC ........... 528/354; 435/139; 435/141; 435/142; 435/146; 525/410; 525/411; 525/415; 525/450; 528/361
(58) Field of Classification Search
  USPC .................. 435/139, 141, 142, 146; 525/410, 525/411, 415, 450; 528/354, 361
  See application file for complete search history.

(56) References Cited

U.S. PATENT DOCUMENTS

| | | | | |
|---|---|---|---|---|
| 5,338,822 | A * | 8/1994 | Gruber et al. | 528/354 |
| 5,439,985 | A * | 8/1995 | Gross et al. | 525/411 |
| 5,939,467 | A * | 8/1999 | Wnuk et al. | 523/128 |
| 6,706,942 | B1 * | 3/2004 | Zhao et al. | 604/364 |
| 6,767,972 | B1 * | 7/2004 | Irick et al. | 525/445 |
| 2008/0188629 | A1 | 8/2008 | Yano | |

FOREIGN PATENT DOCUMENTS

| | | |
|---|---|---|
| JP | 11-116785 | 4/1999 |
| JP | 2000-192370 | 7/2000 |
| JP | 3599533 | 9/2004 |
| JP | 3609543 | 10/2004 |
| JP | 2005-23260 | 1/2005 |
| JP | 2006-274182 | 10/2006 |
| JP | 2006-335909 | 12/2006 |
| JP | 2007-56247 | 3/2007 |
| JP | 2007-77232 | 3/2007 |
| JP | 2007-231034 | 9/2007 |
| WO | WO02/06400 | 1/2002 |

OTHER PUBLICATIONS

Schreck, K.M.; Renewable, Degradable Polymers for Polylactide Toughening, Apr. 2007, p. 39-81.*
Ferreira, B.M.P.; Zavaglia, C.A.C.; Duek, E.A.R.; Journal of Applied Polymer Science, 2002, vol. 86, p. 2898-2906.*
Iannace, S.; Ambrosio, L.; Huang, S.J.; Nicolais, L.; Journal of Applied Polymer Science, 1994, vol. 54, p. 1525-1536.*
Reeve, M.S.; McCarthy, S.P.; Gross, R.A.; Macromolecules, 1993, vol. 26, p. 888-894.*
Schreck, K.M.; Hillmyer, M.A.; Journal of Biotechnology, 2007, vol. 132, p. 287-295.*
Kawamoto, N.; Sakai, A.; Horikoshi, T.; Urushihara, T.; Tobita, E.; Journal of Applied Polymer Science, 2007, vol. 103, p. 244-250.*
Oct. 6, 2010 European search report in connection with a counterpart European patent application No. 10168590.

* cited by examiner

*Primary Examiner* — Robert Jones, Jr.
(74) *Attorney, Agent, or Firm* — Cooper & Dunham LLP

(57) ABSTRACT

Disclosed is a copolymer resin composition including a lactic acid copolymer, the lactic acid copolymer containing monomer units represented by the following chemical formulas [1], [2], and [3],

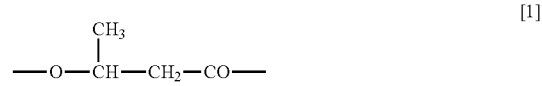

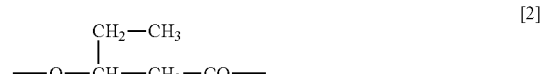

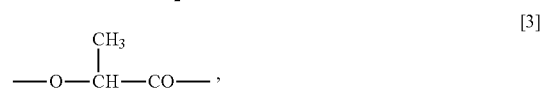

wherein a content of a monomer unit represented by the chemical formula [3] is 50 mol % or more and 95 mol % or less, a weight-average molecular weight of the lactic acid copolymer is 20,000 or more and 1,000,000 or less, and a deflection temperature of the lactic acid copolymer under load is 65° C. or higher and 100° C. or lower at a bending stress of 1.80 MPa.

16 Claims, 2 Drawing Sheets

COPOLYMER RESIN COMPOSITION, MOLDED PRODUCT, AND METHOD OF MANUFACTURING A COPOLYMER RESIN COMPOSITION

BACKGROUND OF THE INVENTION

1. Field of the Invention

The present invention relates to a copolymer resin composition, a molded product, and a method of manufacturing a copolymer resin composition.

2. Description of the Related Art

Due to the raising of awareness of a recent global warming issue, technical development for providing biodegradability and reducing an amount of a used fossil resource has been actively conducted. One of these developments is a movement to replace a plastic material whose raw material is petroleum with a biomass material.

Meanwhile, many resin components are utilized for components used in an electro-photographic instrument such as a copying machine or a laser printer or an image output instrument using an ink jet technique or components of an electric or electronic instrument such as a home electric appliance or interior equipment of an automobile. These resin components are almost all made of a raw material of petroleum but an alternative technique for a biomass resource-derived resin is desired in view of an issue of reduction of an amount of emitted carbon dioxide, an issue of depletion of a petroleum resource, an issue of a non-biodegradable plastic, and the like.

A biomass resource means a resource of a product from an organism such as a plant or an animal, and indicates not only a conventionally known raw material such as wood, cotton, silk, wool, or a natural rubber but also starch obtained from corn, a soy bean, or an animal, a fat and oil, raw garbage, or the like. A biomass resource-derived resin is made from a raw material that is such a biomass resource, and generally, is often a biodegradable resin. A biodegradable resin is a resin which is decomposed by a microbe(s) at a condition of temperature and humidity under a natural environment. Additionally, a biodegradable resin is not only a biomass resource-derived resin but also may be a petroleum-derived resin, however, most of petroleum-derived resins are non-biodegradable. For a biomass resource-derived biodegradable resin, there is known a polylactic acid (PLA) made by chemical polymerization of a lactic acid as a raw material which is provided by fermenting a carbohydrate such as potato, sugar cane or corn, an esterified starch based on a starch, a polyhydroxy alkanoate (PHA) which is a microbe-yielded polyester resin that is yielded inside the body of a microbe, a polytrimethylene terephthalate (PTT) whose raw materials are 1,3-propanediol obtained by a fermentation method and terephthalic acid derived from a petroleum, or the like.

Furthermore, while a PBS (polybutylene succinate) whose raw materials are butanediol and succinic acid is manufactured from petroleum-derived raw materials at present, a study for transferring to a biomass-derived resin is being conducted, and manufacturing of succinic acid as one of principal raw materials from a plant in the future is being studied.

Among the biomass resource-derived resins, a polylactic acid has a melting point around 180° C. which is high, is comparatively excellent in a moldability and processability thereof, and is supplied to the market in a stable amount thereof, and a molded product to which it has been applied has been put in practical use. However, a polylactic acid has a glass transition point around 56° C. which is low, and accordingly, has a drawback of a heat distortion temperature around 55° C. which provides a low heat resistance. Furthermore, a polylactic acid is a crystalline resin, and accordingly, has a low impact resistance, wherein an Izod impact strength thereof is 2 kJ/m$^2$ or less, whereby it is difficult to conduct employment thereof for a durable member of a product of electric or electronic instrument.

It is known that one way to improve a physical property of a polylactic acid is a method for making a polymer alloy together with a polycarbonate resin which is a petroleum-derived resin. However, the rate of a used petroleum-derived resin is high in order to ensure a physical property of a molded product and the rate of an included biomass resource-derived resin is only able to be around 50% whereby the effect of reducing an amount of emitted carbon dioxide or the effect of reducing an amount of a used petroleum for reduction of an environmental load is reduced by about half.

Meanwhile, a polylactic acid is a crystalline resin, and hence, a technique for facilitating crystallization thereof to improve the heat resistance thereof has been studied. For a crystallization method, there are known a method of reheating (annealing) after molding to improve a degree of crystallization and a method of molding while a crystallization nucleating agent is added. A method of annealing after molding does not only have problems of a complicated molding process and a long time period of molding but also is required to provide a die for annealing or the like in order to avoid deformation involved with crystallization, and thus there are problems in the cost and productivity.

For a method of adding a crystallization nucleating agent, development of a crystallization nucleating agent to improve a degree of crystallization and a rate of crystallization is advanced, but, even if a crystallization nucleating agent is added, a time period of crystallization of about 2 minutes is required at present, and accordingly, it is not possible to conduct molding in a time period of a molding cycle similar to that of a petroleum-derived and general-purpose resin. Furthermore, it is necessary to conduct crystallization at a temperature around 100 to 110 degrees, whereby it is not possible to conduct molding by using an inexpensive water cooling-type die temperature control machine and there is a problem of increasing of an environmental load due to a required high temperature. Moreover, when only a polylactic acid is crystallized, a deflection temperature thereof under load is around 55° C. at a high load (a load of 1.80 MPa) even if sufficient crystallization is conducted by annealing or the like, whereby there is a problem of an insufficient heat resistance.

A microbe-yielded polyhydroxy alkanoate (PHA) resin that is excellent in a heat resistance thereof is easy to cause thermal decomposition at the time of heating and there is a problem of a physical property degradation caused by thermal decomposition when a molded product is produced by a processing method such as injection molding. It is difficult to suppress reduction of a molecular weight of a polyhydroxy alkanoate resin even if a conventional thermal stabilizer, an antioxidant, or an anti-hydrolyzing agent is added thereto.

Specific documents in regard to manufacturing of a biodegradable resin from a biomass resource-derived resin will be provided below.

Japanese Patent Application Publication No. 2006-335909 and Japanese Patent Application Publication No. 2007-056247 propose methods of blending of about half of a resin whose raw material is a petroleum resource, such as a polycarbonate resin, into a polylactic acid resin to improve a deflection temperature under load or an impact resistance. For example, Japanese Patent Application Publication No. 2006-335909 discloses a component for an electronic instrument characterized by including 20-80 parts by mass of a polylactic acid, 20-70 parts by mass of a polycarbonate, and further 0.1-50 parts by mass of a reinforcing material, and 0.5-35 parts by mass of a flame retardant. Furthermore, Japanese Patent Application Publication No. 2007-056247 discloses a resin composition provided by compounding 0.1-50 parts by weight of a flame retardant to a polymer compound of 95-5% by weight of a polylactic acid resin and 5-95% by weight of an aromatic polycarbonate resin, which polymer compound is graft-polymerized with 0.1-50 parts by weight of an acryl resin unit or styrene resin unit, relative to the total amount of those resins of the polymer compound as 100 parts by weight.

Furthermore, as described in Japanese Patent Application Publication No. 2007-231034 and Japanese Patent Application Publication No. 2005-023260, a biomass-type filler material such as a paper powder, a wood powder or a natural fiber is added into a polylactic acid resin whereby it is possible to improve the mechanical strength of the resin. By using this method, it is possible to improve the rate of a constituting biomass material without using a petroleum-derived resin. For example, Japanese Patent Application Publication No. 2007-231034 proposes a material for a housing characterized by mixing and kneading a natural fiber impregnated with a flame retardant with at least a plant resource-derived resin, wherein a fiber selected from the group composed of kenaf fibers, hemp fibers, and jute fibers is disclosed for the natural fiber.

Japanese Patent Application Publication No. 2005-023260 proposes an electric or electronic component provided by molding a resin composition which is provided by compounding 1-350 parts by weight of a natural product-derived organic filler material relative to 100 parts by weight of a plant resource-derived resin. It is characterized that the plant resource-derived resin is a polylactic acid resin and the natural product-derived organic filler material is at least one kind selected from paper powders and wood powders wherein 50% by weight or more of the paper powder is a waste paper powder. Furthermore, it describes that a crystallization nucleating agent is added in order to improve the heat resistance of a polylactic acid resin or a plasticizer as a crystallization facilitating agent is added whereby it is possible to improve a degree of crystallization of a polylactic acid resin.

Japanese Patent Application Publication No. 2007-077232 proposes a biodegradable polyester-type resin composition for accelerating a crystallization rate of an aliphatic polyester-type polymer (P3HA) composed of a repeating unit represented by a formula of [—CHR—$CH_2$—CO—O—] (in which formula, R is an alkyl group represented by $C_nH_{2n+1}$ and n=an integer of 1 or more and 15 or less) whose crystallization is particularly slow among biodegradable polyesters and for improving a processability and a processing rate in a molding process such as injection molding, film molding, blow molding, fiber spinning, extrusion foaming, bead foaming, or the like. Such a biodegradable polyester-type resin composition is a mixture of a P3HA yielded from a microbe and a crystallization nucleating agent composed of one or more kinds selected from polyvinyl alcohols (PVAs), chitins, and chitosans, wherein it is considered that PVAs, chitins, and chitosans are suitable crystallization nucleating agents for a P3HA. Additionally, a poly(3-hydroxybutyrate (P3HB) and a copolymer of (3-hydroxybutyrate (3HB))/(3-hydroxyhexanoate (3HHx)) are disclosed for a specific aliphatic polyester-type polymer.

Japanese Patent Application Publication No. 2006-274182 proposes a polylactic acid resin composition for optics which is composed of a polylactic acid-type resin, a polyhydroxy-alkanoate copolymer, and a carbodiimide compound. Such a polylactic acid resin composition for optics is excellent in a transparency, has an improved tensile characteristic, and contains 99.9-80 parts by mass of a polylactic acid resin and 0.1-20 parts by mass of a polyhydroxyalkanoate copolymer.

Japanese Patent No. 3609543 proposes an aliphatic polyester-type polymer blend including a lactic acid-type polymer and a hydroxyalkanoic acid-type polymer, which is intended to increase the biodegradability of a lactic acid-type polymer that is a biodegradable resin and improve a moldability thereof. It is considered that such an aliphatic polyester-type polymer blend has a high biodegradability and an improved moldability and further is excellent in a characteristic of a molded product.

Japanese Patent No. 3599533 proposes a heat-resistant resin composition which contains a polylactic acid and an aliphatic polyester other than polylactic acids and includes a crystalline $SiO_2$ as a crystalline inorganic filler component. Such a heat-resistant resin composition includes (A) a polymer composition component which contains (a1) 75-25% by weight of a polylactic acid and (a2) 25-75% by weight of an aliphatic polyester with a melting point of 100-250° C. other than polylactic acids and (B) 0.1-70 parts by weight of a crystalline inorganic filler component which contains 10% by weight or more of a crystalline $SiO_2$ relative to 100 parts by weight of the polymer composition component (A). It is considered that such a heat-resistant resin composition is capable of being injection-molded at a die temperature that is a glass transition temperature (Tg) or lower or around room temperature (0-60° C.), has a high crystallization rate and a sufficiently high degree of crystallization in a molding process, thus accordingly has an excellent heat resistance, is difficult to cause degradation of a polymer component in use, and has a property for hardly causing embrittlement. In a specific and practical example, a resin for which a polybutylene succinate has been used is disclosed, and a chemical polymerization treatment method such as a dehydration or condensation polymerization method, an indirect polymerization method for melting and polymerizing a cyclic dimmer, a ring-opening polymerization method for melting and polymerizing a cyclic dimmer under the presence of a catalyst, or the like, is illustrated for a method of manufacturing an aliphatic polyester.

International publication No. 02/006400 proposes a lactic acid-type resin composition composed of a mixture of (A) a mixture of (a1) a polylactic acid and (a2) an aliphatic polyester and (B) an aliphatic block copolyester having a polylactic acid segment and an aliphatic polyester segment. Such a lactic acid-type resin composition is excellent in a moldability, a flexibility and a safety and further has a biodegradability after use whereby waste disposal is facilitated. In such a lactic acid-type resin composition, an aliphatic polyester(s) (a2) is/are a polybutylene succinate and/or a polycaprolactone and 2-component mixture (A) composed of a polylactic acid (a1) and an aliphatic polyester (a2) is compatibilized with a 2-component aliphatic block copolyester (B).

Even if a petroleum resource-derived resin such as a polycarbonate resin is blended with a polylactic acid resin by about half to improve a heat resistance or a mechanical strength, the effect of replacing a resin product with a biomass material is only reduced by half from the viewpoint of a countermeasure for global environment. Furthermore, the price of a petroleum-derived resin used for a blend may be elevated depending on a tendency of depletion of crude oil in the future so that it may be impossible to use a petroleum-derived resin substantially.

When a method is used which utilizes a natural organic substance-type filler material such as a paper powder, a wood powder or a natural fiber for a polylactic acid resin, it is possible to increase the ratio of a constituting biomass material to provide a resin composition for which a petroleum resource is hardly used. However, for example, the particle size of a paper powder, a wood powder, or a natural fiber used in Japanese Patent Application Publication No. 2005-023260 is about 1-10 mm, whereby the paper powder, the wood powder, the natural fiber, or the like emerges on the surface of a resin component, and hence, is not able to be used for a molded product requiring a high appearance precision or beautiful appearance, such as an exterior housing of an electric product. Furthermore, when a paper powder, a wood powder, or a natural powder is pulverized in order to improve an appearance precision or beautiful appearance, an increase of a production cost is caused.

While it is necessary to increase a degree of crystallization in order to improve the heat resistance of a polylactic acid resin, a method of adding a crystallization nucleating agent or adding a plasticizer as a crystallization promoter is known for increasing a degree of crystallization. However, it is known that even if the degree of crystallization of a polylactic acid resin is thus increased, a deflection temperature under load is merely improved to about 55° C. at a high load (for example, 1.80 MPa). Furthermore, a high die temperature and a long molding time period are required for crystallizing a polylactic acid, and, for example, a die temperature of 100° C. and a molding cycle time period of 90-100 seconds are needed for molding a tensile test piece with a thickness of 3 mm. For a conventional fossil resource-derived resin (for example, a polypropylene or a polystyrene), a molding cycle time period for molding a similar tensile test piece is no more than about 30 seconds at a die temperature of about 50° C., and a large problem in industrial production of a molded product of a polylactic acid resin is as to a facility of molding.

On the other hand, utilization of a biodegradable resin whose monomer unit is 3-hydroxybutyric acid (3HB) or 3-hydroxyvaleric acid (3HV) has been considered for a polyalkanoate resin containing no lactic acid. Among these, a copolymer of 3-hydroxybutyric acid-3-hydroxyvarelic acid is able to be yielded by means of microbe fermentation on a glucose-based medium and is expected to be an alternative item of a polylactic acid resin or a complementary resin for a blend or the like. However, a 3HB-3HV copolymer is readily thermally-decomposed and there is a problem of degradation of a physical property due to decomposition at a step of a molding process such as injection molding. It is not possible to solve such a problem by increase of the molecular weight of a copolymer, addition of a crystallization nucleating agent, or blending of a polylactic acid resin.

In regard to a biodegradable polyester-type resin composition as described in Japanese Patent Application Publication No. 2007-077232, a crystallization temperature of a specifically disclosed biodegradable polyester-type resin composition to be molded is 110° C. which is high (see FIG. 4 in Japanese Patent Application Publication No. 2007-077232) and it is difficult to control a die temperature to about 90° C. or lower which is the upper limit of the temperature of a water-cooling-type temperature control machine. Furthermore, an amorphous portion remains even for a molding time period of 40 seconds, and accordingly, it is considered that it is difficult for crystallization to proceed sufficiently. Moreover, a polyhydroxybutyrate or a polyhydroxybutyrate-hydroxyvalerate copolymer has a problem of a significant reduction of a molecular weight in a thermal process which causes reduction of the strength of a resin molded product or the like.

A polylactic acid resin composition as disclosed in Japanese Patent Application Publication No. 2006-274182 is a transparent material for optics and is not crystallized but solidified at an amorphous state, and hence, it is considered that a heat resistance is not sufficient in order to be used for a housing of an electric or electronic instrument or the like. As guessing from a disclosed configuration, the heat resistance of such a polylactic acid resin composition is supposed to be about 55° C.-60° C. which is around a glass transition point of a polylactic acid.

A specific configuration of an aliphatic polyester-type polymer blend as disclosed in Japanese Patent No. 3609543 is a polymer blend of an aliphatic polyester containing a polyethylene glycol chain in the main chain thereof and a poly(3-hydroxybutyric acid) (P3HB). However, no crystallization nucleating agent is included, and hence, it is considered that there remain problems of improvement of a heat resistance, lowering of a molding temperature, and a reduction of a molding time period.

For a heat-resistant resin composition as proposed in Japanese Patent No. 3599533, further improvement of a heat resistance is desired. Furthermore, a study of a method for manufacturing a resin which is not based on a chemical treatment in polymerization but based on a microbe treatment is expected.

For a lactic acid-type resin composition as proposed in International Publication No. 02/006400, an aliphatic block copolyester (B) having a polylactic acid segment and an aliphatic polyester segment is used to improve the compatibility between a polylactic acid (a1) and an aliphatic polyester (a2) in a mixture (A) thereof. Hence, it is necessary to specially select the composition or molecular structure of an aliphatic block copolyester (B).

As described above, a general-purpose resin having a biodegradability and being producible economically for which it is possible to use a biomass raw material is still being developed. In particular, no resin composition having a heat resistance over 60° C. which could not have been achieved by a polylactic acid, being excellent in a moldability and is capable of being used for a general-purpose molded product has been obtained. Most of biomass-type resin compositions which are considered to be capable of being used practically are intended to blend a petroleum-type resin into a polylactic acid so as to improve the property thereof and a process for kneading a resin is required. Furthermore, many of biomass-derived polyester resins have less favorable thermal decomposition characteristics and the problem is that when a shear stress is applied at a high temperature for a long time period in a process of kneading two or more kinds of resins, degradation of a physical property occurs readily. Moreover, a blending technique for stabilizing a physical property is needed for a resin blend, in view of a change in the compatibility of each of the resins, the difference between crystallization temperatures thereof, or the like.

SUMMARY OF THE INVENTION

According to one aspect of the present invention, there is provided a copolymer resin composition including a lactic acid copolymer, the lactic acid copolymer containing monomer units represented by the following chemical formulas [1], [2], and [3],

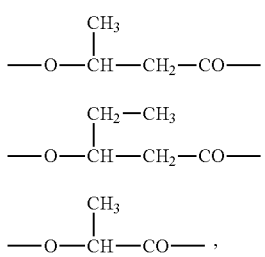

$$\begin{align}
&\text{—O—CH(CH}_3\text{)—CH}_2\text{—CO—} \quad [1]\\
&\text{—O—CH(CH}_2\text{CH}_3\text{)—CH}_2\text{—CO—} \quad [2]\\
&\text{—O—CH(CH}_3\text{)—CO—} \quad [3]
\end{align}$$

wherein a content of a monomer unit represented by the chemical formula [3] is 50 mol % or more and 95 mol % or less, a weight-average molecular weight of the lactic acid copolymer is 20,000 or more and 1,000,000 or less, and a deflection temperature of the lactic acid copolymer under load is 65° C. or higher and 100° C. or lower at a bending stress of 1.80 MPa.

According to another aspect of the present invention, there is provided a copolymer resin composition including a thermal stabilizer and/or an anti-hydrolyzing agent, and a lactic acid copolymer, the lactic acid copolymer containing monomer units represented by the following chemical formulas [1], [2], and [3],

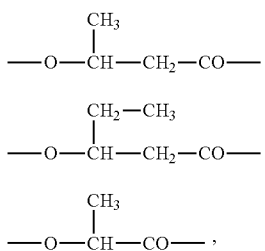

$$\begin{align}
&\text{—O—CH(CH}_3\text{)—CH}_2\text{—CO—} \quad [1]\\
&\text{—O—CH(CH}_2\text{CH}_3\text{)—CH}_2\text{—CO—} \quad [2]\\
&\text{—O—CH(CH}_3\text{)—CO—} \quad [3]
\end{align}$$

wherein a content of a monomer unit represented by chemical formula [3] is 30 mol % or more and 95 mol % or less, and a weight average molecular weight of the lactic acid copolymer is 20,000 or more and 1,000,000 or less.

According to another aspect of the present invention, there is provided a molded product including the copolymer resin composition as described above, wherein the resin composition is molded by a method of injection molding within a mold temperature of 50° C. or higher and 90° C. or lower.

According to another aspect of the present invention, there is provided a method of manufacturing a copolymer resin composition, including a polyester yielding step of yielding a polyester containing a 3-hydroxybutyric acid monomer unit and a 3-hydroxyvaleric acid monomer unit by a microbial fermentation method, a lactic acid copolymer manufacturing step of adding a lactic acid to the polyester to an extent that a monomer unit ratio of the lactic acid in the polyester is 50 mol % or more and 95% or less, to manufacture a lactic acid copolymer with a weight-average molecular weight of 20,000 or more and 1,000,000 or less, and a nucleating agent adding step of adding a nucleating agent to the lactic acid copolymer to provide the copolymer resin composition, the deflection temperature of the copolymer resin composition under load being 65° C. or higher and 100° C. or lower at a bending stress of 1.80 MPa.

According to another aspect of the present invention, there is provided a method of manufacturing a copolymer resin composition, including a polyester yielding step of yielding a polyester containing a 3-hydroxybutyric acid monomer unit and a 3-hydroxyvaleric acid monomer unit by a microbial fermentation method, a lactic acid copolymer manufacturing step of adding a lactic acid to the polyester to an extent that a monomer unit ratio thereof is 30 mol % or more and 95% or less, to manufacture a lactic acid copolymer with a weight-average molecular weight of 20,000 or more and 1,000,000 or less, and a additive adding step of adding a thermal stabilizer and/or an anti-hydrolyzing agent to the lactic acid copolymer.

DETAILED DESCRIPTION OF THE PREFERRED EMBODIMENTS

Figure 1:
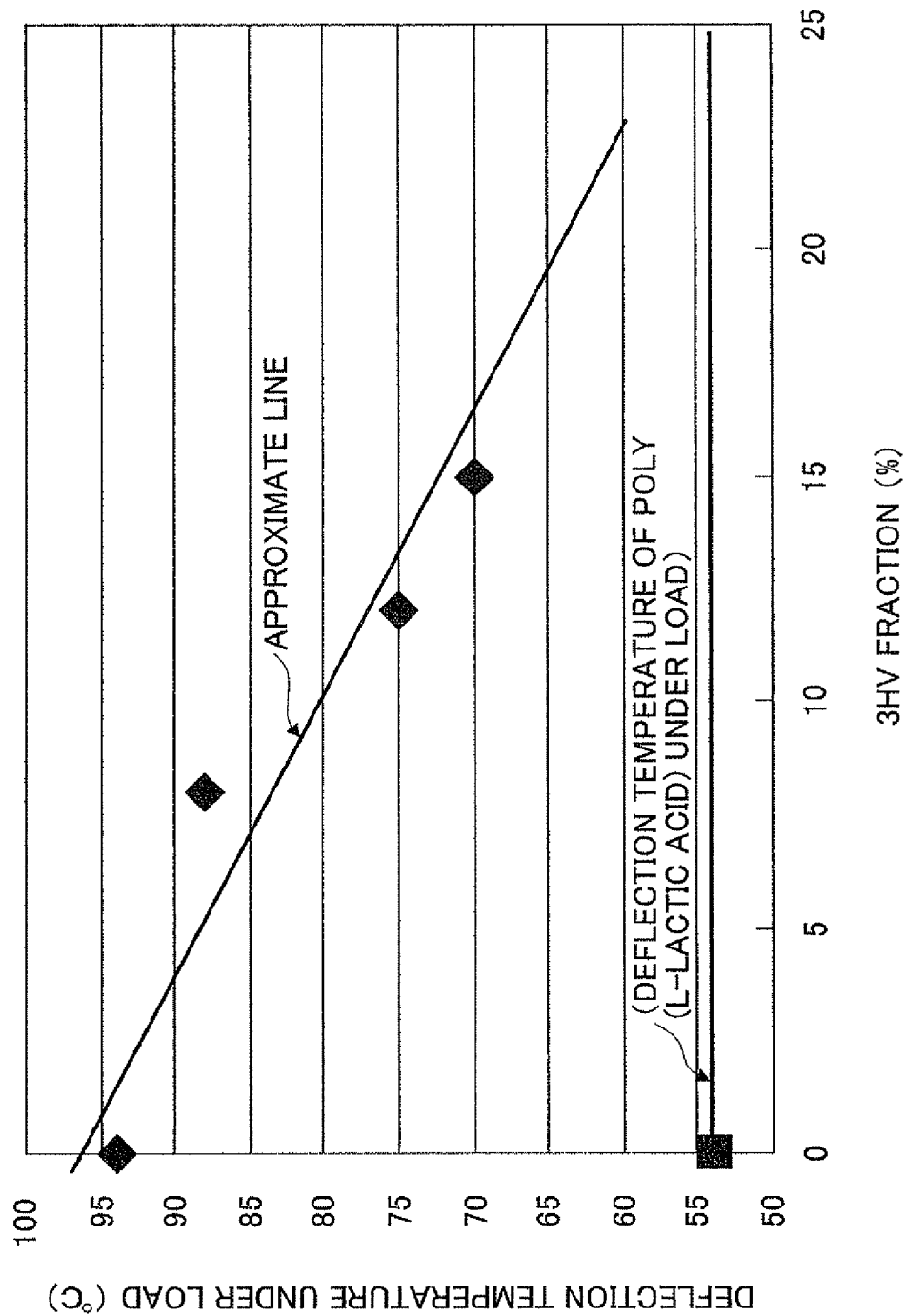
FIG. 1 is a diagram illustrating a relationship between a molar fraction (%) of a valeric acid monomer unit(s) (3HV) in a resin composition and a deflection temperature of the resin composition under load.

Next, at least one embodiment of the present invention will be described with reference to the accompanying drawings.

One object of an embodiment of the present invention is to provide a biomass-type copolymer resin composition having a moldability and producibility comparable to those of a petroleum-type resin and being excellent in a heat resistance, a molded product using such a copolymer resin composition, and a method of manufacturing such a copolymer resin composition.

A copolymer resin composition according to an embodiment of the present invention includes a lactic acid copolymer containing monomer units represented by the following chemical formulas [1], [2], and [3]:

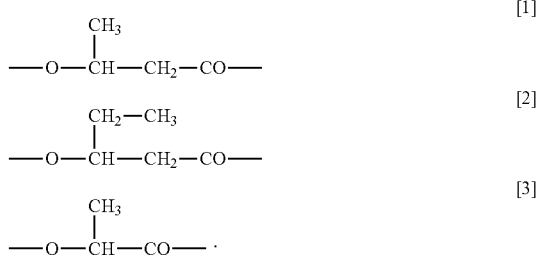

$$\begin{align}
&\text{—O—CH(CH}_3\text{)—CH}_2\text{—CO—} \quad [1]\\
&\text{—O—CH(CH}_2\text{CH}_3\text{)—CH}_2\text{—CO—} \quad [2]\\
&\text{—O—CH(CH}_3\text{)—CO—} \quad [3]
\end{align}$$

A monomer unit represented by chemical formula [1] is a monomer unit in which a hydroxyl group and carboxyl group of a-hydroxybutyric acid (3-hydroxybutanoic acid; which may be abbreviated as 3HB) are bonding groups. Similarly, a monomer unit represented by chemical formula [2] is a monomer unit in which a hydroxyl group and carboxyl group of 3-hydroxyvaleric acid (3-hydroxypentanoic acid; which may be abbreviated as 3HV) are bonding groups and a monomer unit represented by chemical formula [3] is a monomer unit in which a hydroxyl group and carboxyl group of lactic acid (2-hydroxyproionic acid; which may be abbreviated as LA) are bonding groups. Although 3 kinds of monomer units, that is, 3HB, 3HV, and LA, in a lactic acid copolymer may be arranged randomly or may be arranged to have regularity, it is possible to preferably use a lactic acid copolymer having a configuration such that a LA polymer block is added to copolymer polyester blocks of 3HB and 3HV. Copolymer polyester blocks of 3HB and 3HV are preferably yielded by a fermentation method, and a rate or arrangement of a monomer unit constituting a block copolymer in which lactic acid is addition-polymerized into copolymer polyester blocks of 3HB and 3HV yielded by a fermentation method is readily controlled, whereby a molecular weight is comparatively readily controlled and a preferable raw material of a molded product which is excellent in a heat resistance or mechanical strength is provided.

A content of a lactic acid monomer unit(s) represented by chemical formula [3] in a lactic acid copolymer according to one embodiment of the present invention is 50 mol % or more and 95 mol % or less. When a content of a lactic acid monomer unit(s) in a lactic acid copolymer is less than 50 mol %, a thermal decomposition retention rate of the lactic acid copolymer tends to be low, whereby thermal decomposition or molecular weight reduction of a resin composition may readily be caused by a heating treatment in a kneading or molding process. When a content of a lactic acid monomer unit(s) is over 95 mol %, a property similar to that of a polylactic acid resin is provided and a heat resistance of a molded product may be degraded.

When a content of a lactic acid monomer unit(s) in a copolymer resin composition according to an embodiment of the present invention is 50 mol % or more and 95% or less, a deflection temperature under load is 65° C. or higher and 100° C. or lower at a bending stress of 1.80 MPa. Such a deflection temperature under load is measured by means of JIS K 7191-2 (1996), wherein a strip test piece with a length of 130 mm, a width of 3.2 mm, and a height of 12.7 mm from a copolymer resin composition is manufactured by means of injection molding (wherein the strip test piece may be annealed after molding) and a measurement for it is performed at a supporting point distance of 100 mm, a temperature rising rate of 2° C./min, and a bending stress of 1.80 MPa (method A). A general-purpose resin molded product is usable for a wide variety of applications as long as a defection temperature under load as described above is 65° C. to 100° C., and in particular, a molded product as a housing for an electric or electronic instrument has a sufficient heat resistance. However, it has not been easy to make a deflection temperature of a conventional polylactic acid resin under load be 65° C. or less, even if, for example, a crystallizing agent is added thereto.

A content of a lactic acid monomer unit(s) in a lactic acid copolymer according to another embodiment of the present invention may be 30 mol % or more and 95 mol % or less. When a content of a lactic acid monomer unit(s) in a lactic acid copolymer is 30 mol % or more and less than 50 mol %, a thermal stabilizer and/or an anti-hydrolyzing agent is contained in a copolymer resin composition. When a thermal stabilizer and/or an anti-hydrolyzing agent is contained, a deflection temperature under load is usually 65° C. or higher and 100° C. or lower at a bending stress of 1.80 MPa, however, it is preferable to contain a thermal stabilizer and/or an anti-hydrolyzing agent so as to attain 65° C. or higher and 100° C. or lower. In addition, even if a content of a lactic acid monomer unit(s) is 50 mol % or more and 95% or less, it is preferable to contain a thermal stabilizer and/or an anti-hydrolyzing agent. A copolymer resin composition according to an embodiment of the present invention contains a thermal stabilizer and/or an anti-hydrolyzing agent whereby a thermal stability is high, and a sufficient thermal stability is retained against a heat treatment in a molding process such as injection molding. Hence, a significant reduction of a molecular weight in a heating process as found in a polyhydroxybutyrate which is a microbe-yielded polyhydroxyalkanoate or a polyhydroxybutyrate-hydroxyvalerate copolymer is eliminated and a problem of reduction of the strength of a molded product or the like is eliminated.

A thermal stabilizer and/or an anti-hydrolyzing agent for an embodiment of the present invention may be any of a thermal stabilizer and/or anti-hydrolyzing agent to be used for a biomass resource-derived resin such as a polylactic acid. For a thermal stabilizer for an embodiment of the present invention, it is possible to provide, for example, an antioxidant or the like. For an antioxidant, it is possible to provide, for example, a phenol-type antioxidant, a phosphate-type antioxidant, a sulfur-containing antioxidant, a thioether-type antioxidant, an epoxy compound, a hydroxylamine-type compound, or the like. For an anti-hydrolyzing agent, it is possible to provide, for example, a carbodiimide compound-type anti-hydrolyzing agent, an isocyanate compound, an oxazoline-type compound, an epoxy compound, an epoxydated aliphatic acid alkyl ester, an epoxydated aliphatic acid glycerin ester, or the like.

Among the above-mentioned thermal stabilizers and/or anti-hydrolyzing agents, at least, any one selected from phenol-type antioxidants, phosphate-type antioxidants, and carbodiimide compound-type anti-hydrolyzing agents is used preferably. Furthermore, it is possible to use plural kinds of thermal stabilizers and/or anti-hydrolyzing agents simultaneously to improve the effect thereof. For example, a phenol-type antioxidant, a phosphate-type antioxidant, and a carbodiimide compound-type anti-hydrolyzing agent are used simultaneously whereby a more preferable effect is expected.

For a phenol-type antioxidant, it is possible to provide a hindered phenol, a polycyclic hindered phenol, a monoester-type hindered phenol, a tetraester-type hindered phenol, a diester-type hindered phenol, or the like. For a monoester-type hindered phenol, it is possible to provide n-octadecyl 3-(4'-hydroxy-3',5'-di-t-butylphenyl)propionate, pentaerythrityl tetrakis[3-(3,5-di-t-butyl-4-hydroxyphenyl)propionate], n-octadecyl 3-(3,5-di-t-butyl-4-hydroxyphenyl)propionate, or the like. For a tetraester-type hindered phenol, it is possible to provide tetrakis[methylen-3-(3',5'-di-t-butyl-4'-hydroxyphenyl)propionate]methane, or the like.

For a phosphite-type antioxidant, it is possible to provide tris(2,4-di-t-butylphenyl)phosphite, tris[2-[[2,4,8,10-tetrakis (1,1-dimethylethyl)dibenzo[d,f][1,3,2]dioxaphosphin-6-yl] oxy]ethyl]amine, 3,9-bis(2,6-di-tetra-butyl-4-methylphenoxy)-2,4,8,10-tetraoxa-3,9-diphosphaspiro [5.5]undecane, 2,2'-bis(2,6-di-tert-butyl-4-methylphenoxy)-5,5'-spirobi[1, 3,2-dioxaphosphorinan], 2,2'-bis(2,6-di-tert-butyl-4-methylphenoxy)spiro[4H-1,3,2-dioxaphosphorin-5(6H), 5'(6'H)-[4H-1,3,2]dioxaphosphorin], 2,2'-bis(2,6-di-tert-butyl-4-methylphenoxy)spiro[1,3,2-dioxaphosphorinan-5,5'-[1,3,2] dioxaphosphorinan], 3,9-bis(2,6-di-tert-butyl-4-methylphenyloxy)-2,4,8,10-tetraoxa-3,9-diphosphaspiro [5.5]undecane, 2,2'-bis(2,4-di-tert-butylphenoxy)spiro[1,3, 2-dioxaphosphorinan-5,5'-[1,3,2]dioxaphosphorinan], or the like.

For a carbodiimide compound-type anti-hydrolyzing agent, it is possible to provide a carbodiimide-modified isocyanate, or the like.

For a copolymer resin composition according to an embodiment of the present invention, a weight-average molecular weight (MW) of a lactic acid copolymer is 20,000 or higher and 1,000,000 or lower, preferably 50,000 or higher and 800,000 or lower, and more preferably 70,000 or higher and 800,000 or less. When a weight-average molecular weight is lower than 20,000, a molded product may readily be fragile and a mechanical strength, in particular, an impact resistance, may be so low that it may be impossible to make use thereof for a general-purpose resin molded product. It may not be easy to manufacture a lactic acid copolymer with a weight-average molecular weight more than 1,000,000.

A copolymer resin composition according to an embodiment of the present invention includes a configuration as described above, thereby being producible from a biomass raw material that is readily available similarly to a polylactic acid resin composition, having biodegradability, having a heat resistance higher than that of a polylactic acid resin composition, and being excellent in a moldability, and it is possible to suppress thermal decomposition thereof in a heating process compared with a conventionally known microbe-yielded polyhydroxyalkanoate for a molded body.

For a copolymer resin composition according to an embodiment of the present invention, a molar ratio of an 3HB monomer unit(s) represented by the above-mentioned chemical formula [1] in a lactic acid copolymer to a 3HV monomer unit(s) represented by chemical formula [2] is preferably in a range of 99:1 to 75:25 and more preferably in a range of 95:5 to 80:20. When a molar ratio of a 3HB monomer unit(s) to a 3HV monomer unit(s) is in a range of 99:1 to 75:25, a heat resistance of a copolymer resin composition is improved and a biomass raw material based on glucose is readily utilized so that it is possible to exploit such a merit in a raw material supply or production process.

When a ratio of a 3HB monomer unit(s) in a copolymer resin composition according to an embodiment of the present invention is increased, a heat resistance is improved, and when a ratio of a 3HV monomer unit(s) is increased, an impact resistance tends to be improved. When a molar ratio of a 3HB monomer unit(s) to a 3HV monomer unit(s) is in the above-mentioned range, it is possible to provide a copolymer resin composition which has a mechanical strength as a general-purposed resin, has a heat resistance higher than that of a polylactic acid resin, is excellent in a moldability, and is capable of suppressing thermal decomposition in a heating process.

In a copolymer resin composition according to an embodiment of the present invention, a thermal decomposition retention rate (molecular weight retention rate) of a lactic acid copolymer is preferably 80% or more. When a thermal decomposition retention rate of a lactic acid copolymer is 80% or more, it is possible to obtain a molded product with a maintained property of a copolymer resin composition with little thermal decomposition on heating in a palletizing or molding process and to utilize it for various kinds of applications as general-purpose resin molded products such as housings of electric or electronic instruments. Additionally, the thermal decomposition retention rate of a lactic acid copolymer is represented by a decreasing rate (%) of a weight-average molecular weight (MW) of a copolymer resin composition in the case where heating is made at 200° C. for 1 minute. A conventionally known 3HB-3HV copolymer has a degraded thermal decomposition characteristic, and a thermal decomposition retention rate could usually not have been 80% or more, even if a thermal stabilizer is added.

In a copolymer resin composition according to an embodiment of the present invention, a lactic acid monomer unit represented by chemical formula [3] is preferably either of an L-lactic acid monomer unit or a D-lactic acid monomer unit. When a lactic acid monomer unit is either of an L-lactic acid monomer unit or a D-lactic acid monomer unit, it is possible to obtain a copolymer resin composition which is excellent in a heat resistance, in particular, a thermal decomposition retention rate, as compared to a polymer of a lactic acid monomer unit(s) from a racemic body (DL body) which is a mixture of an L-lactic acid and a D-lactic acid. Additionally, an L-lactic acid and a D-lactic acid are not necessarily pure but may be optical isomers with a purity that is obtained industrially.

Preferably, a copolymer resin composition according to an embodiment of the present invention further includes a crystallization nucleating agent. In particular, a crystallization nucleating agent is preferably one or more selected from a talc-type nucleating agent, a nucleating agent composed of a metal salt-type material having a phenyl group, and a benzoyl compound-type nucleating agent.

A crystallization nucleating agent promotes crystallization of a polylactic acid-type resin composition so that it is possible to lower a mold temperature at the time of molding, reduce a molding time period, and improve a heat resistance of an obtained molded product. Among crystallization nucleating agents, a talc-type nucleating agent, a nucleating agent composed of a metal salt-type material having a phenyl group, or a benzoyl compound-type nucleating agent has a good compatibility with a copolymer resin composition according to an embodiment of the present invention and is excellent in an effect of promoting crystallization.

A molded product according to an embodiment of the present invention is characterized in that a copolymer resin composition including a crystallization nucleating agent according to an embodiment of the present invention as described above is molded by an injection molding method while a mold temperature is 50° C. or higher and 90° C. or lower. In particular, a molded product according to an embodiment of the present invention is excellent for a molded product such as a housing of an electric or electronic instrument.

When a mold temperature in a process of injection molding of a resin is about 90° C. or less, it is possible to employ an inexpensive and convenient water-medium method for a mold temperature regulating device necessitated for an injection molding process (an oil-medium method is generally employed for mold temperature regulation over 90° C.). Furthermore, when a mold temperature is low, it is possible to accelerate cooling of a molten resin (a molded product before hardening) injected into a mold cavity and reduce a molding time period. This is achieved by finding that a copolymer resin composition according to an embodiment of the present invention is different from a polylactic acid and sufficiently advances crystallization in a temperature range of 50° C. or higher and 90° C. or lower, and further, when a crystallization nucleating agent is added, crystallization is particularly accelerated in the above-mentioned temperature range.

A general-purpose resin molded product is usable for a wide variety of applications if the above-mentioned deflection temperature under load is 65° C. to 100° C., and in particular, a molded product has a sufficient heat resistance as a housing of an electric or electronic instrument. Furthermore, a resin molded product according to an embodiment of the present invention is also preferable in that a raw material availability and a mass production capability are excellent for a general-purpose resin molded product such as a housing of an electric or electronic instrument and attention to environment such as biodegradability is made.

A method for manufacturing a copolymer resin composition according to an embodiment of the present invention includes a polyester yielding process for yielding a polyester (3HB-3HV copolymer) containing a 3-hydroxybutyric acid (3HB) monomer unit(s) and a 3-hydroxyvaleric acid (3HV) monomer unit(s) by means of a microbe fermentation method and a lactic acid copolymer manufacturing process for manufacturing a lactic acid copolymer (lactic acid-containing polyester) with a weight average molecular weight of 20,000 or more and 1,000,000 or less by adding a lactic acid to the above-mentioned polyester such that a rate of a monomer unit(s) is in a range of 30 mol % or more and 95 mol % or less, and preferably 50 mol % or more and 95 mol % or less. A method for manufacturing a copolymer resin composition according to an embodiment of the present invention preferably includes a nucleating agent adding process for adding a nucleating agent to the above-mentioned lactic acid copolymer to provide a copolymer resin composition with a deflection temperature of 65° C. or higher and 100° C. or lower under load at a bending stress of 1.80 MPa. Furthermore, a method for manufacturing a copolymer resin composition according to an embodiment of the present invention preferably includes a additive adding process for adding a thermal stabilizer and/or an anti-hydrolyzing agent to the above-mentioned lactic acid copolymer to provide a copolymer resin composition. In particular, when a rate of a lactic acid monomer unit(s) is 30 mol % or more and less than 50 mol %, an additive adding process is needed for adding a thermal stabilizer and/or an anti-hydrolyzing agent to the above-mentioned lactic acid copolymer to provide a copolymer resin composition.

For a thermal stabilizer and/or an anti-hydrolyzing agent, it is possible to use each kind of those described above, and among these, at least one selected from a phenol-type antioxidant, a phosphite-type antioxidant, and a carbodiimide compound-type anti-hydrolyzing agent is preferably used. Furthermore, it is possible for a thermal stabilizer and/or an anti-hydrolyzing agent to use plural kinds thereof simultaneously so as to improve their effect. For example, a phenol-type antioxidant, a phosphate-type antioxidant, and a carbodiimide compound-type anti-hydrolyzing agent are used simultaneously whereby a more preferable effect is expected.

In a method for manufacturing a copolymer resin composition according to an embodiment of the present invention, a polyester (3HB-3HV copolymer) is yielded by a microbe fermentation method in a polyester-yielding process, whereby a condition of microbe fermentation is controlled appropriately so that it is possible to readily control a molecular weight of a polyester, constitution ratios and arrangement of a 3HB monomer unit(s) and a 3HV monomer unit(s), and the like. Furthermore, a polyester (3HB-3HV copolymer) with a comparatively high molecular weight is readily yielded in accordance with a microbe fermentation method, and hence, this is hydrolyzed whereby it is also possible to obtain a polyester (3HB-3HV copolymer) with a desired weight average molecular weight.

In a lactic acid copolymer manufacturing process, a lactic acid is added to a polyester (3HB-3HV copolymer) with a predetermined weight average molecular weight to manufacture a lactic acid copolymer whereby it is possible to make and introduce a block of lactic acid monomer units in a polyester. Hence, a rate of a lactic acid monomer unit(s) in a copolymer resin composition according to an embodiment of the present invention is readily controlled and it is also possible to control a molecular weight of a lactic acid copolymer, a deflection temperature or thermal decomposition retention rate of a copolymer resin composition under load, or the like, which is preferable for a raw resin material of a molded product excellent in a heat resistance or mechanical strength.

In a method for manufacturing a copolymer resin composition according to an embodiment of the present invention, a molar ratio of a 3HB monomer unit(s) to a 3HV monomer unit(s) in the above-mentioned polyester is preferably in a range of 99:1 to 75:25.

In a polyester yielding process by a microbe fermentation method, a molar ratio of a 3HB monomer unit and a 3HV monomer unit in a polyester is controlled in the above-mentioned range whereby it is possible to provide a resin composition which has a heat resistance higher than a polylactic acid resin and is capable of suppressing thermal decomposition in a heating process.

According to an embodiment of the present invention, it is possible to provide a biomass-type resin composition having biodegradability and a sufficient heat resistance or mechanical strength without containing a petroleum-type resin, a molded produce using it, and a method for manufacturing a biomass-type resin composition.

A copolymer resin composition will be described for an illustrative embodiment of the present invention.

(Copolymer Resin Composition)

Monomer units of a lactic acid copolymer in the present embodiment have three components. Monomer units of a lactic acid copolymer include a 3-hydroxybutyric acid (3HB) monomer unit(s) represented by the above-mentioned chemical formula [1], a 3-hydroxyvaleric acid (3HV) monomer unit(s) represented by the above-mentioned chemical formula [2], and a lactic acid (LA) monomer unit(s) represented by the above-mentioned chemical formula [3], wherein these are copolymerized via ester bonds. For a lactic acid copolymer in the present embodiment, a lactic acid monomer unit is copolymerized with a copolymer (3HB-3HV copolymerization polyester) of a 3HB monomer unit(s) and a 3HV monomer unit(s).

(3HB-3HV Copolymerization Polyester)

A 3HB-3HV copolymerization polyester (abbreviated as a polyester, simply) according to an embodiment of the present invention may be a copolymer (abbreviated name: P-3HB-co-3HV) of 3-hydroxybutyric acid (abbreviated as 3HB) and 3-hydroxyvaleric acid (abbreviated as 3HV), and may include another monomer component, such as a copolymer (abbreviated name: P-3HB-co-3HV-co-3HHx) in which 3-hydroxyhexanoic acid (abbreviated name: 3HHx) is further copolymerized with a P-3HB-co-3HV. A P-3HB-co-3HV is preferably used from the viewpoint of productivity or economical efficiency.

A 3HB-3HV copolymerization polyester (P-3HB-co-3HV) according to an embodiment of the present invention is also referred to as a polyhydroxyalkanoate (abbreviated name: PHA) and has biodegradability. From the viewpoint of higher availability of a raw material(s) and biodegradability, preferable are ones yielded by a microbe fermentation method while glucose, propionic acid, or the like is a carbon source. It is possible for a microbe fermentation method to yield one by feeding propionic acid or a $C_6$ or more and even number fatty acid to a microbe having a gene of a polyhydroxyalkanoate synthase on a glucose medium. For example, it is possible to yield a P-3HB-co-3HV in two steps of bacteria proliferation and polyester yield wherein polyhydroxyalkanoate yielding bacteria such as bacillus bacteria, ralstonia bacteria, and pseudomonas bacteria is used by a cultivation method in which nitrogen or a phosphate in medium components is controlled.

It is possible for pseudomonas, ralstonia, bacillus, or corynebacterium to yield poly(3-hydroxybutyrate) (abbreviated name: p-3HB) on an LB medium, MR medium, or the like, wherein glucose is a carbon source, and while this is a supplementary raw material, propionic acid or a $C_6$ or more and even number fatty acid is added to control nitrogen or a phosphate in medium components whereby it is possible to yield a polyhydroxyalkanoate (PHA) which is a kind of 3HB copolymer such as a 3HB-3HV copolymerization polyester.

(Lactic Acid Copolymer)

A lactic acid copolymer (Co-PLA) according to an embodiment of the present invention is a copolymer which further contains a lactic acid monomer unit(s) in addition to the above-mentioned 3HB-3HV copolymerization polyester (PHA) and a kind of a polyhydroxyalkanoate in a broad sense. For a lactic acid copolymer, a lactic acid, 3HB, and 3HV may randomly or regularly be copolymerized. A lactic acid copolymer in an embodiment of the present invention is preferably a block copolymer in which a lactic acid is addition-polymerized with a PHA yielded by the above-mentioned microbe fermentation method. Such a block copolymer is excellent in a heat resistance, a thermal decomposition retention rate, a biodegradability or the like, and a resin composition using such a block copolymer is readily molded so as to provide a short cycle time period of molding whereby it is possible to provide a general-purpose resin molded product with a preferable heat resistance.

For addition polymerization of a lactic acid to a PHA, a PHA and a lactic acid may be polymerized in an organic solvent by using a polymerization initiator such as tin octoate. It is possible to control a content of a lactic acid monomer unit(s) in an obtained lactic acid copolymer or molecular weight of a lactic acid copolymer based on a ratio of a lactic acid and a raw material PHA, a quantity of a polymerization initiator to be added, a reaction temperature, a reaction time period, or the like. Usually, it is possible to obtain a desired Co-PLA at a reaction temperature of 100 to 150° C. for about 10 to 50 hours. Furthermore, a PHA obtained by the above-mentioned microbe fermentation method may be hydrolyzed to provide a desired molecular weight and used for control of a molecular weight of a lactic acid copolymer or a molecular weight of a 3HB, 3HV copolymerization polyester block (PHA block) in a lactic acid copolymer.

Although a lactic acid to be used for manufacturing a Co-PLA in an embodiment of the present invention may be any lactic acid, an L-lactic acid, a D-lactic acid, and a mixture of an L-lactic acid and a D-lactic acid (racemic body, DL-body) is used which are manufactured by a conventionally known microbe fermentation method. In particular, when either an L-lactic acid or a D-lactic acid is a raw material to manufacture a Co-PLA, it is possible and preferable to suppress thermal decomposition of an obtained Co-PLA in a molding process. Additionally, an L-lactic acid or a D-lactic acid is produced by a usual separation technique or synthesis technique and may not strictly be only an L-lactic acid or D-lactic acid.

A weight average molecular weight MW of a lactic acid copolymer to be used in the present embodiment is controlled by means of control of a molecular weight of a hydroxyalkanoate copolymer block and control of a molecular weight of a polylactic acid block. A weight average molecular weight MW of a lactic acid copolymer is 20,000 to 1,000,000. When a weight average molecular weight MW deviates from the above-mentioned range, a heat resistance, impact resistance, or moldability of a molded product of a resin composition may be degraded. In particular, when a weight average molecular weight MW is less than 20,000, a resin composition tends to be fragile so that a moldability or impact resistance may be degraded.

(Thermal Stabilizer and Anti-Hydrolyzing Agent)

A copolymer resin composition according to the present embodiment includes a phenol-type antioxidant or a phosphite-type antioxidant as a thermal stabilizer for a resin composition, and preferably includes a carbodiimide compound-type anti-hydrolyzing agent as an anti-hydrolyzing agent, for example, a polycarbodiimide resin (commercial name: Carbodilite, produced by Nisshinbo Chemical Inc.) or the like. A thermal stabilizer or anti-hydrolyzing agent to be added may be one selected from the above-mentioned 3 kinds of additives, but the above-mentioned 2 kinds of thermal stabilizers or anti-hydrolyzing agents have functions different from each other and it is preferable to add both of these additives. A quantity of a thermal stabilizer or anti-hydrolyzing agent to be added depends on the kind thereof, and generally, about 0.1 part by mass to about 5 parts by mass per 100 parts by mass of a copolymer resin composition is preferable for each of them.

(Crystallization Nucleating Agent)

A crystallization nucleating agent to be used for a copolymer resin composition according to an embodiment of the present invention may be any crystallization nucleating agent to be used for a thermoplastic resin derived from a biomass resource such as a polylactic acid. For example, a talc-type nucleating agent, a nucleating agent composed of a metal salt-type material having a phenyl group, a benzoyl compound-type nucleating agent, or the like is preferably used. Another publicly known crystallization nucleating agent such as a lactate (salt), a benzoate (salt), silica, a phosphate (ester salt) may be used.

(Other Additives)

It is preferable to further add a silicone-type fire retardant, an organic metal salt-type fire retardant, an organic phosphorus-type fire retardant, a metal oxide-type fire retardant, a metal hydroxide-type fire retardant, or the like to a copolymer resin composition according to the present embodiment. Thereby, it is possible to improve a fire retardant property so as to suppress spread of fire and it is possible to improve a fluidity of a biodegradable resin composition so as to ensure a more excellent moldability.

For the silicone-type fire retardant, it is possible to use, for example, an alkylsiloxane, an alkylphenylsiloxane, or the like. More specifically, it is possible to use "X40-9805" (commercial name) from Shin-Etsu Chemical Co., Ltd., "MB50-315" (commercial name) from Dow Corning Silicone Co., or the like.

For the above-mentioned organic metal salt-type fire retardant, it is possible to use, for example, an organic sulfonic acid metal salt such as potassium trichlorobenzenesulfonate, potassium perfluorobutanesulfonate, or potassium diphenylsulfone-3-sulfonate; an aromatic sulfonimide metal salt; a polystyrene sulfonic acid alkali metal salt in which a sulfonic acid metal salt, a sulfuric acid metal salt, a phosphoric acid metal salt, or a boric acid metal salt bonds to an aromatic ring of an aromatic group-containing polymer such as a styrene-type polymer or a polyphenylene ether; or the like.

For the above-mentioned organic phosphorus-type fire retardant, it is possible to use, for example, phosphine, phosphine oxide, biphosphine, a phosphonium salt, phosphinic acid, a phosphoric acid ester, a phosphorous acid ester, or the like. More specifically, it is possible to use, triphenyl phosphate, neopentyl methyl phosphite, diethyl pentaerythritol diphosphite, neopentyl methyl phosphonate, neopentyl phenyl phosphate, diphenyl pentaerythritol diphosphate, dicyclopentyl hypodiphosphate, dineopentyl hypophosphite, phenyl pyrocatechol phosphite, ethyl pyrocatechol phosphate, dipyrocatechol hypodiphosphate, or the like.

For the above-mentioned metal oxide-type fire retardant, it is possible to use, for example, magnesium oxide, and for the above-mentioned metal hydroxide-type fire retardant, it is possible to use, for example, magnesium hydroxide.

Furthermore, it is possible to add a lactic acid-type polyester as a modifying agent to a copolymer resin composition according to the present embodiment. Thereby, not only an impact resistance is improved but also an effect of attainment of a fire retardant property is improved. For a lactic acid-type polyester as a modifying agent, it is possible to use a polymer obtained by copolymerizing a lactic acid, a dicarboxylic acid and a diol. For such a dicarboxylic acid, it is possible to provide, for example, succinic acid, adipic acid, sebacic acid, decanedicarboxylic acid, cyclohexanedicarboxylic acid, phthalic acid, terephthalic acid, isophthalic acid, or the like. Also, for a diol, it is possible to provide, for example, ethylene glycol, propylene glycol, 1,3-propanediol, 1,4-butanediol, 1,5-pentanediol, 1,6-hexanediol, or the like. More specifically, it is possible to preferably use "EXP-PD-150" (commercial name) from DIC Corporation. Furthermore, for another modifying agent, it is possible to use 1,3-butanediol sebacate or the like.

For a copolymer resin composition according to the present embodiment, it is possible to add a filler. For a filler, it is possible to provide a talc, a mica, a montmorillonite, a kaolin, or the like. When such a filler is a crystalline nucleus, crystallization of a polylactic acid is accelerated and an impact strength and a heat resistance of a molded product are improved. Furthermore, it is also possible to improve a stiffness of a molded product.

Also, it is possible to compound a kind of additive such as a plasticizer, a compatibilizing agent, a weatherability-improving agent, an ultraviolet-ray-absorbing agent, a processing aid, an antistatic agent, a coloring agent, a lubricant, a mold releasing agent, into a copolymer resin composition according to the present embodiment appropriately. For a plasticizer, it is possible to use a publicly known plasticizer which is generally used for a polymer without a particular limitation and it is possible to provide, for example, a polyester plasticizer, a glycerin-type plasticizer, a polyhydric carboxylic acid ester-type plasticizer, a polyalkylene glycol-type plasticizer, an epoxy-type plasticizer, or the like. A compatibilizing agent is not particularly limited as long as it functions as a compatibilizing agent for a thermoplastic resin (A) and a polylactic acid. For a compatibilizing agent, it is possible to provide an inorganic filler, a glycidyl compound, a polymer compound provided by graft-polymerizing or copolymerizing an acid anhydride, or an organic metal compound, and one kind or two or more kinds of them may be used. A heat resistance, a bending strength, an impact strength, a fire retardant property, or the like is also improved by kneading them whereby an application to a molded product such as a housing of an electronic instrument representing a notebook computer, a mobile phone, and the like is further promoted.

Furthermore, it is possible to add a hemp fiber, a chitin/chitosan, a palm husk fiber, a kenaf, a short fiber (with a length of 10 mm or less) derived therefrom, a powder derived therefrom, or the like, as a filler. It is possible for such a filler to improve a mechanical strength, stiffness, or heat resistance of a molded product. Furthermore, these are natural materials and do not degrade a biodegradability of a molded product. Moreover, it is preferable to add a glass fiber, a carbon fiber, a glass flake, a glass bead, or the like, as a filler. Thereby, it is possible to improve a stiffness of a molded product. The above-mentioned filler may be subjected to a surface treatment such as coating with a polylactic acid, another fatty acid, or the like, or may be subjected to a surface treatment with a silane coupling agent or the like.

For a plant fiber, it is possible to provide a directly dried or milled plant fiber, one containing a lignin, a hemicellulose, or another component, a plant fiber dried or milled after delignification by means of alkali treatment, a milled pulp or waste paper, a more finely milled or microfibril one, or the like. For a material for improving a mechanical strength of a molded product, it is possible to use a microbe-yielded bacteria cellulose or the like other than a plant fiber, which is not particularly limited as long as it is a biomass. The kind of a raw material plant is also not particularly limited and it is desirable to appropriately select a compound or a compounding ratio thereof from a rapid growth plant such as a jute, a kenaf, or a bamboo, a rice, corn, or sugar cane after an edible portion is recovered, or the like, while taking harmony with the environment into consideration.

When a mechanical strength-improving material such as a plant fiber is used, it is also possible to appropriately compound a coupling agent or a compatibilizing agent. It is possible to use a publicly known coupling agent without a particular limitation and it is possible to provide, for example, a silane coupling agent, an aminosilane coupling agent, an alkoxysilane coupling agent, or the like. Also, for a compatibilizing agent, it is possible to provide an inorganic filler, a glycidyl compound, a polymer compound provided by graft-polymerizing or copolymerizing an acid anhydride, or an organic metal compound, and one kind or two or more kinds of them may be used.

(Physical Property Measurement)

Weight average molecular weight of lactic acid copolymer

A weight average molecular weight (MW) of a lactic acid copolymer (Co-PLA) in an embodiment of the present invention is 20,000 to 1,000,000, and preferably, 70,000 to 800,000. A weight average molecular weight of a lactic acid copolymer or the like is calculated as a standard polystyrene-equivalent value from a gel Permeation Chromatography (GPC). Additionally, a weight average molecular weight (MW) of a copolymer resin composition may be measured in which an additive such as a crystallization nucleating agent is added to a lactic acid copolymer. In this case, it is possible to conduct a measurement in a GPC method while a fraction in a low molecular weight region is eliminated which fraction is considered to originate from an additive component.

Measurement of molar ratio of monomer unit of lactic acid copolymer or the like

A molar ratio of a lactic acid monomer unit(s) in a lactic acid copolymer (Co-PLA) in an embodiment of the present invention is 50 to 95 mol %. It is possible to calculate molar ratios of a lactic acid monomer unit(s), a 3HB monomer unit(s), and a 3HV monomer unit(s) from a result of a proton NMR measurement.

Deflection temperature under load

A deflection temperature of a copolymer resin composition according to an embodiment of the present invention under load is 65 to 100° C. For a deflection temperature under load, a deflection temperature under load is measured in accordance with "JIS K 7191-2 (1996) A" method, that is, at a bending stress of 1.80 MPa. Specifically, a strip specimen with a length of 130 mm, a width of 3.2 mm, and a height of 12.7 mm is used and measurement is conducted at a supporting point distance of 100 mm, a temperature rising rate of 2° C./min, and a bending stress of 1.80 MPa. A pellet of a copolymer resin composition is molded by using an electrically-driven injection molding machine with a mold clamping pressure of 50 tons at a mold temperature of 80° C., a cylinder temperature of 180° C., an injection speed of 20 mm/s, an injection pressure of 100 MPa, and a cooling time period of 30 sec and conducting an annealing to cause sufficient crystallization, whereby a strip specimen is manufactured.

Additionally, a resin composition that is not limited to a biomass-type one is usable in the case where a heat resistance is 56° C. or higher, however, when it is used for a housing of an electronic or electric instrument, it is necessary to ensure a heat resistance in a temperature environment at the time of transportation of such an electronic or electric instrument to at 60 to 65° C. Hence, a resin composition having a heat resistance at 65° C. or higher is often selected for an electronic or electric instrument while a tolerance is taken into account. A method of testing a heat resistance of a resin composition is generally evaluated by a deflection temperature under load in accordance with the JIS standard while a mechanical stress being caused in a housing is taken into consideration.

Thermal Decomposition Retention Rate

A thermal decomposition retention rate (%) (which is also referred to as a molecular weight retention rate) of a copolymer resin composition according to an embodiment of the present invention is preferably 80% or more. A thermal decomposition retention rate is represented by a rate of decrease of a weight average molecular weight (MW) after a Co-PLA is heated at 200° C. for 10 minutes. Calculation is made with a specific calculation formula:

[Thermal decomposition retention rate]={[MW before heating]−[MW after heating]}/[MW before heating]×100.

Additionally, it is possible to measure a weight average molecular weight (MW) by the above-mentioned GPC method. For a copolymer resin composition in which an additive such as a crystallization nucleating agent is added to a lactic acid copolymer, a weight average molecular weight (MW) is calculated in a GPC method, while a fraction in a low molecular weight region is eliminated which fraction is considered to originate from an additive component, similarly to measurement of a weight average molecular weight.

A condition for testing a thermal decomposition retention rate is set based on a condition for molding a resin composition. For a copolymer resin composition according to an embodiment of the present invention, a cylinder temperature at the time of molding is, for example, 180° C., and accordingly, a condition for testing a thermal decomposition retention rate is a comparatively strict condition of 200° C. while a tolerance of a temperature variation is taken into account. Furthermore, a time period in which a resin composition to be molded stays in a heating cylinder of an injection molding machine is, for example, about 5 to 10 minutes, and accordingly, a heating time period is determined to be 10 minutes. A thermal decomposition retention rate is calculated from thermal decomposition retention rates of a resin composition before and after the above-mentioned testing condition. It is generally known that a molecular weight of a resin composition is reduced under a heating condition and a mechanical strength such as an impact strength is degraded. There is a proportional relation between a molecular weight and impact strength of a resin composition, and a thermal decomposition retention rate is preferably 80% or higher in order to retain 50% or higher of an impact strength when an impact strength before decomposition is 100.

PRACTICAL EXAMPLE 1

<Manufacturing of Polyester 1>

A culture medium provided by using and cultivating bacillus on a medium containing 5.0 g/l of peptone, 5.0 g/l of yeast extract, and 5.0 g/l of meat extract for 16 hours was subjected to cultivation at 45° C. for 48 hours on a minimal medium (containing glucose) with limited amounts of nitrogen sources to which propionic acid was added, so that cultivated bacteria containing a polyester were obtained. The obtained cultivated bacteria were lyophilized and chloroform was added to extract intracellular substances. After insoluble components were filtered out, methanol was added into a filtrate to precipitate a bacterial extract again and filtration was made again to obtain a purified bacteria-yielded product. The bacteria-yielded product was treated with an alkaline and warm water and accordingly hydrolyzed to reduce the molecular weight thereof, so that polyester 1 was provided. As polyester 1 was subjected to an NMR analysis, a polyester (P-3HB-co-3HV) was identified whose containment ratio (molar ratio) of 3-hydroxybutyric acid monomer units (3HB) and 3-hydroxyvaleric acid monomer units (3HV) was about 83:17.

<Manufacturing of Lactic Acid Copolymer 1 and Copolymer Resin Composition 1>

Then, 0.05 g/l of polyester 1, 0.95 g/l of lactic acid, and 0.1 g/l of tin octoate were added into an anhydrous toluene solution, stirred at 130° C. in nitrogen atmosphere for 24 hours, and subsequently, further left as it stood at 130° C. for 24 hours. After it was held in a vacuum for 1 hour and returned at room temperature, an obtained product was dissolved in chloroform and methanol and hexane were added to filter and recover a precipitate. The dissolution, precipitation, and filtration were repeated for purification, and finally, vacuum drying was conducted to obtain a purified product. The obtained purified product was subjected to an NMR analysis and identified to be a lactic acid copolymer (Co-PLA) which was referred to as lactic acid copolymer 1. The containment ratio (molar ratio) of L-lactic acid monomer units (LLA), 3-hydroxybutyric acid monomer units (3HB), and 3-hydroxyvaleric acid monomer units (3HV) of lactic acid copolymer 1 was 95:4:1. Furthermore, the weight average molecular weight (MW) of lactic acid copolymer 1 based on a GPC method was 171,000 as a standard polystyrene equivalent value. No additive such as a crystallization nucleating agent was added into lactic acid copolymer 1 to provide resin composition 1 directly.

<Measurement of Deflection Temperature of Resin Composition 1 Under Load>

Resin composition 1 was molten and kneaded at a temperature of 180° C. by a uniaxial kneading extruder to manufacture a pellet with a size of about 3 mm for molding. After the manufactured pellet was dried at 50° C. by using a multi-deck hot air dryer for 12 hours, injection molding was conducted by using an electrically-driven injection molding machine with a mold clamping pressure of 50 tons and setting a mold temperature of 80° C., a cylinder temperature of 180° C., an injection speed of 20 mm/s, an injection pressure of 100 MPa, and a cooling time period of 30 sec. A molded product was subjected to primary annealing at 80° C. for 15 minutes and secondary annealing at 60° C. for 12 hours to provide a strip specimen for testing a defection temperature under load. The sizes of the manufactured strip specimen had a length of 130 mm, a width of 3.0 mm, and a height of 12.7 mm. A test of a deflection temperature under load was conducted in accordance with JIS K 7191-2 (1996). Additionally, a supporting point distance, a temperature rising rate, and a bending stress were 100 mm, 2° C./min, and 1.08 MPa, respectively. The deflection temperature of resin composition 1 under load was 82° C.

<Measurement of Thermal Decomposition Retention Rate of Resin Composition 1>

1 g of resin composition 1 was placed on a hot plate and heated at 200° C. for 10 minutes. Each of the weight average molecular weights (MW) of resin composition 1 before heating and after heating thereof was measured based on a GPC method and the thermal decomposition retention rate (%) thereof was calculated by using the following formula:

Thermal decomposition retention rate={(MW before heating)−(MW after heating)}/(MW before heating)×100.

The thermal decomposition retention rate of resin composition 1 was 95%.

The above-mentioned composition and properties of resin composition 1 are summarized and indicated in the column of practical example 1 in Table 1. Herein, the copolymerization ratios in Table 1 are molar ratios of 3HB, 3HV, and LA in lactic acid copolymer 1 and numerals in parentheses in the columns of 3HB and 3HV indicate molar ratios of 3HB and 3HV in resin composition 1.

PRACTICAL EXAMPLE 2

<Manufacturing of Polyester 2>

Polyester 2 whose containment ratio (molar ratio) of 3-hydroxybutyric acid monomer units (3HB) and 3-hydroxyvaleric acid monomer units (3HV) was 92:8 was manufactured similarly to practical example 1 except that the cultivation condition of the bacillus medium and the hydrolysis condition of the obtained bacteria-yielded products were modified in <manufacturing of polyester 1> of practical example 1.

<Manufacturing of lactic acid copolymer 2 and resin composition 2>

A purified product was obtained similarly to practical example 1 except that 0.2 g/l of polyester 2, 0.8 g/l of L-lactic acid, and 0.1 g/l of tin octoate were added instead of addition of 0.05 g/l of polyester 1, 0.95 g/l of L-lactic acid, and 0.1 g/l of tin octoate in <manufacturing of lactic acid copolymer 1> of practical example 1. The obtained purified product was subjected to an NMR analysis and identified to be a lactic acid copolymer (Co-PLA) which was referred to as lactic acid copolymer 2. The containment ratio (molar ratio) of L-lactic acid monomer units (LLA), 3-hydroxybutyric acid monomer units (3HB), and 3-hydroxyvaleric acid monomer units (3HV) of lactic acid copolymer 2 was 81:18:1. Furthermore, the weight average molecular weight (MW) of lactic acid copolymer 2 based on a GPC method was 454,000 as a standard polystyrene equivalent value. No additive such as a crystallization nucleating agent was added into lactic acid copolymer 2 to provide resin composition 2 directly.

<Measurement of Deflection Temperature Under Load and Thermal Decomposition Retention Rate of Resin Composition 2>

The deflection temperature under load and thermal decomposition retention rate of resin composition 2 were measured similarly to practical example 1 and the results of the measurement are indicated together with the composition of resin composition 2 and the like in the column of practical example 2 in Table 1 similarly to practical example 1.

PRACTICAL EXAMPLE 3

<Manufacturing of polyester 3>

Polyester 3 whose containment ratio (molar ratio) of 3-hydroxybutyric acid monomer units (3HB) and 3-hydroxyvaleric acid monomer units (3HV) was 97:3 was manufactured similarly to practical example 1 except that the cultivation condition of the bacillus medium and the hydrolysis condition of the obtained bacteria-yielded products were modified in <manufacturing of polyester 1> of practical example 1.

<Manufacturing of Lactic Acid Copolymer 3 and Resin Composition 3>

A purified product was obtained similarly to practical example 1 except that 0.5 g/l of polyester 3, 0.5 g/l of L-lactic acid, and 0.1 g/l of tin octoate were added instead of addition of 0.05 g/l of polyester 1, 0.95 g/l of L-lactic acid, and 0.1 g/l of tin octoate in <manufacturing of lactic acid copolymer 1> of practical example 1. The obtained purified product was subjected to an NMR analysis and identified to be a lactic acid copolymer (Co-PLA) which was referred to as lactic acid copolymer 3. The containment ratio (molar ratio) of L-lactic acid monomer units (LLA), 3-hydroxybutyric acid monomer units (3HB), and 3-hydroxyvaleric acid monomer units (3HV) of lactic acid copolymer 3 was 54:44:2. Furthermore, the weight average molecular weight (MW) of lactic acid copolymer 3 based on a GPC method was 73,000 as a standard polystyrene equivalent value. No additive such as a crystallization nucleating agent was added into lactic acid copolymer 3 to provide resin composition 3 directly.

<Measurement of Deflection Temperature Under Load and Thermal Decomposition Retention Rate of Resin Composition 3>

The deflection temperature under load and thermal decomposition retention rate of resin composition 3 were measured similarly to practical example 1 and the results of the measurement are indicated together with the composition of resin composition 3 and the like in the column of practical example 3 in Table 1 similarly to practical example 1.

PRACTICAL EXAMPLE 4

<Manufacturing of Polyester 4>

Polyester 4 whose containment ratio (molar ratio) of 3-hydroxybutyric acid monomer units (3HB) and 3-hydroxyvaleric acid monomer units (3HV) was 85:15 was manufactured similarly to practical example 1 except that the cultivation condition of the bacillus medium and the hydrolysis condition of the obtained bacteria-yielded products were modified in <manufacturing of polyester 1> of practical example 1.

<Manufacturing of lactic acid copolymer 4 and resin composition 4>

A purified product was obtained similarly to practical example 1 except that 0.2 g/l of polyester 4, 0.8 g/l of L-lactic acid, and 0.1 g/l of tin octoate were added instead of addition of 0.05 g/l of polyester 1, 0.95 g/l of L-lactic acid, and 0.1 g/l of tin octoate in <manufacturing of lactic acid copolymer 1> of practical example 1. The obtained purified product was subjected to an NMR analysis and identified to be a lactic acid copolymer (Co-PLA) which was referred to as lactic acid copolymer 4. The containment ratio (molar ratio) of L-lactic acid monomer units (LLA), 3-hydroxybutyric acid monomer units (3HB), and 3-hydroxyvaleric acid monomer units (3HV) of lactic acid copolymer 4 was 80:17:3. Furthermore, the weight average molecular weight (MW) of lactic acid copolymer 4 based on a GPC method was 719,000 as a standard polystyrene equivalent value. No additive such as a crystallization nucleating agent was added into lactic acid copolymer 4 to provide resin composition 4 directly.

<Measurement of Deflection Temperature Under Load and Thermal Decomposition Retention Rate of Resin Composition 4>

The deflection temperature under load and thermal decomposition retention rate of resin composition 4 were measured similarly to practical example 1 and the results of the measurement are indicated together with the composition of resin composition 4 and the like in the column of practical example 4 in Table 1 similarly to practical example 1.

PRACTICAL EXAMPLE 5

<Manufacturing of Resin Composition 5>

In <manufacturing of lactic acid copolymer 1> of practical example 1, 0.5 parts by weight of each of crystallization nucleating agent 1 (a talc-type nucleating agent: PPA-Zn produced by Nissan Chemical Industries, Ltd.), crystallization nucleating agent 2 (a nucleating agent composed of a metal salt-type material having a phenyl group: SG-2000 produced by Nippon Talc Co., Ltd.), and crystallization nucleating agent 3 (a benzoyl compound-type nucleating agent; T-1287N produced by ADEKA Corporation) as crystallization nucleating agents was added to 100 parts by weight of the manufactured lactic acid copolymer 1 and kneaded to provide resin composition 5.

<Measurement of Deflection Temperature Under Load and Thermal Decomposition Retention Rate of Resin Composition 5>

The deflection temperature under load and thermal decomposition retention rate of resin composition 5 were measured similarly to practical example 1 and the results of the measurement are indicated together with the composition of resin composition 5 and the like in the column of practical example 5 in Table 1 similarly to practical example 1.

COMPARATIVE EXAMPLE 1

<Preparation and Measurement of Deflection Temperature Under Load of Resin Composition 6>

A commercially available poly(L-lactic acid) (LACEA H-100 produced by Mitsui Chemicals) was referred to as resin composition 6. The deflection temperature of resin composition 6 under load was measured similarly to practical example 1 and the results of the measurement are indicated in the column of comparative example 1 in Table 2.

COMPARATIVE EXAMPLE 2

<Manufacturing of Resin Composition 7>

In comparative example 1, 0.5 parts by weight of each of crystallization nucleating agent 1 (a talc-type nucleating agent: PPA-Zn produced by Nissan Chemical Industries, Ltd.), crystallization nucleating agent 2 (a nucleating agent composed of a metal salt-type material having a phenyl group: SG-2000 produced by Nippon Talc Co., Ltd.), and crystallization nucleating agent 3 (a benzoyl compound-type nucleating agent; T-1287N produced by ADEKA Corporation) as crystallization nucleating agents was added to 100 parts by weight of the prepared resin composition 6 (commercially available polylactic acid) and kneaded to provide resin composition 7.

<Measurement of Deflection Temperature of Resin Composition 7 Under Load>

The deflection temperature of resin composition 7 under load was measured similarly to practical example 1 and the results of the measurement are indicated together with the composition of resin composition 7 and the like in the column of comparative example 2 in Table 2.

COMPARATIVE EXAMPLE 3

<Manufacturing of Polyester 8>

A polyester whose containment ratio (molar ratio) of 3-hydroxybutyric acid monomer units (3HB) and 3-hydroxyvaleric acid monomer units (3HV) was 92:8 was manufactured by adjusting the cultivation condition of the bacillus medium in <manufacturing of polyester 1> of practical example 1. The weight average molecular weight (MW) of the polyester based on a GPC method was 1,300,000 as a standard polystyrene equivalent value. The polyester was hydrolyzed by an alkaline and warm water to reduce the molecular weight, so that polyester 8 was manufactured.

<Manufacturing of lactic acid copolymer 8 and Resin Composition 8>

A purified product was obtained similarly to practical example 1 except that 0.7 g/l of polyester 8, 0.3 g/l of L-lactic acid, and 0.1 g/l of tin octoate were added instead of addition of 0.05 g/l of polyester 1, 0.95 g/l of L-lactic acid, and 0.1 g/l of tin octoate in <manufacturing of lactic acid copolymer 1> of practical example 1. The obtained purified product was subjected to an NMR analysis and identified to be a lactic acid copolymer (Co-PLA) which was referred to as lactic acid copolymer 8. The containment ratio (molar ratio) of L-lactic acid monomer units (LLA), 3-hydroxybutyric acid monomer units (3HB), and 3-hydroxyvaleric acid monomer units (3HV) of lactic acid copolymer 8 was 35:60:5. Furthermore, the weight average molecular weight (MW) of lactic acid copolymer 8 based on a GPC method was 280,000 as a standard polystyrene equivalent value. No additive such as a crystallization nucleating agent was added into lactic acid copolymer 8 to provide resin composition 8 directly.

<Measurement of Deflection Temperature Under Load and Thermal Decomposition Retention Rate of Resin Composition 8>

The deflection temperature under load and thermal decomposition retention rate of resin composition 8 were measured similarly to practical example 1 and the results of the measurement are indicated together with the composition of resin composition 8 and the like in the column of comparative example 3 in Table 2 similarly to practical example 1.

COMPARATIVE EXAMPLE 4

<Manufacturing of Polyester 9>

Polyester 9 whose containment ratio (molar ratio) of 3-hydroxybutyric acid monomer units (3HB) and 3-hydroxyvaleric acid monomer units (3HV) was 92:8 was manufactured similarly to practical example 1 except that the cultivation condition of the bacillus medium and the hydrolysis condition of the obtained bacteria-yielded products were modified in <manufacturing of polyester 1> of practical example 1. The weight average molecular weight (MW) of polyester 9 based on a GPC method was 1,300,000 as a standard polystyrene equivalent value.

<Manufacturing of Resin Composition 9>

0.5 parts by weight of each of crystallization nucleating agent 1 (a talc-type nucleating agent: PPA-Zn produced by Nissan Chemical Industries, Ltd.), crystallization nucleating agent 2 (a nucleating agent composed of a metal salt-type material having a phenyl group: SG-2000 produced by Nippon Talc Co., Ltd.), and crystallization nucleating agent 3 (a benzoyl compound-type nucleating agent; T-1287N produced by ADEKA Corporation) as crystallization nucleating agents was added to 100 parts by weight of the manufactured polyester 9 and kneaded to provide resin composition 9.

<Measurement of Deflection Temperature Under Load and Thermal Decomposition Retention Rate of Resin Composition 9>

The deflection temperature under load and thermal decomposition retention rate of resin composition 9 were measured similarly to practical example 1 and the results of the measurement are indicated together with the composition of resin composition 9 and the like in the column of comparative example 4 in Table 2 similarly to comparative example 1.

COMPARATIVE EXAMPLE 5

<Manufacturing of Resin Composition 10>

Polyester 10 whose containment ratio (molar ratio) of 3-hydroxybutyric acid monomer units (3HB) and 3-hydroxyvaleric acid monomer units (3HV) was 100:0 was manufactured by adjusting the cultivation condition of the bacillus medium in <manufacturing of polyester 1> of practical example 1. The weight average molecular weight (MW) of polyester 10 based on a GPC method was 25,000 as a standard polystyrene equivalent value. The polyester 10 was directly referred to as resin composition 10.

<Measurement of Deflection Temperature of Resin Composition 10 Under Load>

The deflection temperature of resin composition 10 under load was measured similarly to practical example 1 and the results of the measurement are indicated together with the composition of resin composition 10 and the like in the column of comparative example 5 in Table 3.

COMPARATIVE EXAMPLE 6

<Manufacturing of Resin Composition 11>

Polyester 11 whose containment ratio (molar ratio) of 3-hydroxybutyric acid monomer units (3HB) and 3-hydroxyvaleric acid monomer units (3HV) was 92:8 was manufactured by adjusting the cultivation condition of the bacillus medium in <manufacturing of polyester 1> of practical example 1. The weight average molecular weight (MW) of polyester 11 based on a GPC method was 1,300,000 as a standard polystyrene equivalent value. The polyester 11 was directly referred to as resin composition 11.

<Measurement of Deflection Temperature Under Load and Thermal Decomposition Retention Rate of Resin Composition 11>

The deflection temperature under load and thermal decomposition retention rate of resin composition 11 were measured similarly to practical example 1 and the results of the measurement are indicated together with the composition of resin composition 11 and the like in the column of comparative example 6 in Table 3 similarly to comparative example 5.

COMPARATIVE EXAMPLE 7

<Manufacturing of Resin Composition 12>

Polyester 12 whose containment ratio (molar ratio) of 3-hydroxybutyric acid monomer units (3HB) and 3-hydroxyvaleric acid monomer units (3HV) was 87.6:12.4 was manufactured by adjusting the cultivation condition of the bacillus medium in <manufacturing of polyester 1> of practical example 1. The weight average molecular weight (MW) of polyester 12 based on a GPC method was 780,000 as a standard polystyrene equivalent value. The polyester 12 was directly referred to as resin composition 12.

<Measurement of Deflection Temperature of Resin Composition 12 Under Load>

The deflection temperature of resin composition 12 under load was measured similarly to practical example 1 and the results of the measurement are indicated together with the composition of resin composition 12 and the like in the column of comparative example 7 in Table 3.

COMPARATIVE EXAMPLE 8

<Manufacturing of Resin Composition 13>

Polyester 13 whose containment ratio (molar ratio) of 3-hydroxybutyric acid monomer units (3HB) and 3-hydroxyvaleric acid monomer units (3HV) was 86.4:14.6 was manufactured by adjusting the cultivation condition of the bacillus medium in <manufacturing of polyester 1> of practical example 1. The weight average molecular weight (MW) of polyester 13 based on a GPC method was 1,100,000 as a standard polystyrene equivalent value. The polyester 13 was directly referred to as resin composition 13.

<Measurement of Deflection Temperature of Resin Composition 13 Under Load>

The deflection temperature of resin composition 13 under load was measured similarly to practical example 1 and the results of the measurement are indicated together with the composition of resin composition 13 and the like in the column of comparative example 8 in Table 3.

The compositions, properties, and the like, of the resin compositions in the above-mentioned practical examples 1 to 5, comparative examples 1 to 4, and comparative examples 5 to 8 are indicated in Table 1, Table 2, and Table 3, respectively. Herein, the evaluation results in the following tables indicate that "A" is particularly excellent for a raw material of a resin molded product and "B" is difficult to use directly or not preferable. Furthermore, "n.d." indicates that measurement is not possible or measurement has not yet been conducted.

TABLE 1

|  |  |  | Practical example 1 | Practical example 2 |
|---|---|---|---|---|
| Formulation and property of resin composition | Copolymerization ratio (mol %) | 3HB | 4 | 18 |
|  |  | 3HV | 1 | 1 |
|  |  | LA | 95 | 81 |
|  | Crystallization nucleating agent 1 (wt %) |  |  |  |
|  | Crystallization nucleating agent 2 (wt %) |  |  |  |
|  | Crystallization nucleating agent 3 (wt %) |  |  |  |
|  | Weight-average molecular weight (×10$^4$) |  | 17.1 | 45.4 |
|  | Deflection temperature under load (° C.) |  | 82 | 74 |
|  | Thermal decomposition retention rate (%) |  | 95 | 87 |
|  | Evaluation |  | A | A |

|  |  |  | Practical example 3 | Practical example 4 | Practical example 5 |
|---|---|---|---|---|---|
| Formulation and property of resin composition | Copolymerization ratio (mol %) | 3HB | 44 | 17 | 4 |
|  |  | 3HV | 2 | 3 | 1 |
|  |  | LA | 54 | 80 | 95 |
|  | Crystallization nucleating agent 1 (wt %) |  |  |  | 0.5 |
|  | Crystallization nucleating agent 2 (wt %) |  |  |  | 0.5 |
|  | Crystallization nucleating agent 3 (wt %) |  |  |  | 0.5 |
|  | Weight-average molecular weight (×10$^4$) |  | 7.3 | 71.9 | 17.1 |
|  | Deflection temperature under load (° C.) |  | 86 | 71 | 82 |
|  | Thermal decomposition retention rate (%) |  | 97 | 86 | 98 |
|  | Evaluation |  | A | A | A |

TABLE 2

| | | | Comparative example 1 | Comparative example 2 |
|---|---|---|---|---|
| Formulation and property of resin composition | Copolymerization ratio (mol %) | 3HB | 0 | 0 |
| | | 3HV | 0 | 0 |
| | | LA | 100 | 100 |
| | Crystallization nucleating agent 1 (wt %) | | | 0.5 |
| | Crystallization nucleating agent 2 (wt %) | | | 0.5 |
| | Crystallization nucleating agent 3 (wt %) | | | 0.5 |
| | Weight-average molecular weight ($\times 10^4$) | | n.d. | n.d. |
| | Deflection temperature under load (° C.) | | 56 | 56 |
| | Thermal decomposition retention rate (%) | | n.d. | n.d. |
| | Evaluation | | B | B |

| | | | Comparative example 3 | Comparative example 4 |
|---|---|---|---|---|
| Formulation and property of resin composition | Copolymerization ratio (mol %) | 3HB | 60 | 92 |
| | | 3HV | 5 | 8 |
| | | LA | 35 | 0 |
| | Crystallization nucleating agent 1 (wt %) | | | 0.5 |
| | Crystallization nucleating agent 2 (wt %) | | | 0.5 |
| | Crystallization nucleating agent 3 (wt %) | | | 0.5 |
| | Weight-average molecular weight ($\times 10^4$) | | 28 | 130 |
| | Deflection temperature under load (° C.) | | 86 | 88 |
| | Thermal decomposition retention rate (%) | | 56 | 40 |
| | Evaluation | | B | B |

TABLE 3

| | | | Comparative example 5 | Comparative example 6 |
|---|---|---|---|---|
| Formulation and property of resin composition | Copolymerization ratio (mol %) | 3HB | 100 | 92 |
| | | 3HV | 0 | 8 |
| | | LA | 0 | 0 |
| | Crystallization nucleating agent 1 (wt %) | | | |
| | Crystallization nucleating agent 2 (wt %) | | | |
| | Crystallization nucleating agent 3 (wt %) | | | |
| | Weight-average molecular weight ($\times 10^4$) | | 25 | 130 |
| | Deflection temperature under load (° C.) | | 94 | 88 |
| | Thermal decomposition retention rate (%) | | n.d. | 38 |
| | Evaluation | | B | B |

| | | | Comparative example 7 | Comparative example 8 |
|---|---|---|---|---|
| Formulation and property of resin composition | Copolymerization ratio (mol %) | 3HB | 87.6 | 86.4 |
| | | 3HV | 12.4 | 14.6 |
| | | LA | 0 | 0 |
| | Crystallization nucleating agent 1 (wt %) | | | |
| | Crystallization nucleating agent 2 (wt %) | | | |
| | Crystallization nucleating agent 3 (wt %) | | | |
| | Weight-average molecular weight ($\times 10^4$) | | 78 | 110 |
| | Deflection temperature under load (° C.) | | 75 | 70 |
| | Thermal decomposition retention rate (%) | | n.d. | n.d. |
| | Evaluation | | B | B |

The deflection temperatures of resin compositions 1 to 7 in practical examples 1 to 5 under load were 71 to 86° C. which is 65° C. or higher, whereby it is possible to maintain a mechanical strength in usage environment at a usually envisaged high temperature and it is possible to be available for many applications as general purpose resin molded products such as housings of electric or electronic instruments, so that comprehensive evaluations indicate preferable resin compositions. Additionally, the resin compositions in practical examples 1 to 5 have particularly high thermal decomposition retention rates and accordingly very preferable resin compositions. Furthermore, the thermal decomposition retention rates of resin compositions 1 to 5 are 86% or higher which is sufficiently higher than 80%, whereby a heat resistance is maintained or hardly degraded against heating in a molding process such an injection molding process and it is possible to be available for many applications as general purpose resin molded products such as housings of electric or electronic instruments.

The properties of resin compositions 1 to 13 in practical examples 1 to 5 and comparative examples 1 to 8 will be described specifically.

In resin compositions 1 to 5 in practical examples 1 to 5 which are copolymer resin compositions according to an embodiment of the present invention, the contents of lactic acid (LA) monomer units in lactic acid copolymers 1 to 5 are in a range of 50 to 95 mol % and the molar ratios of 3-hydroxybutyric acid (3HB) monomer units and 3-hydroxyvaleric acid (3HV) monomer units are in a range of 96:4 to 75:25. Furthermore, the weight average molecular weights (MW) of lactic acid copolymers 1 to 5 are in a range of 73,000 to 719,000. Moreover, the deflection temperatures of resin compositions 1 to 5 under load are 71 to 86° C. at a comparatively high load of 1.8 MPa which temperatures are high whereby it is possible to retain the mechanical strength of a molded product sufficiently even at a usually envisaged high temperature. Furthermore, the thermal decomposition retention rates of resin compositions 1 to 5 are 86 to 98% which is high, whereby reduction of the molecular weight is hardly caused even against heating in a molding process such as a kneading, pelletizing or molding process and it is possible to obtain a molded product with a little influence of deformation or shrinkage in a molding process.

On the other hand, resin compositions 6 and 7 in comparative examples 1 and 2 contain none of a 3HB monomer unit and a 3HV monomer unit and the deflection temperatures thereof under load are 56° C. which is low. If the deflection temperature of a resin composition under load is 65° C. or lower, an application as a molded product may be limited, and in particular, use thereof may frequently be limited for an application as a housing of an electric or electronic instrument or a food package, which is required to have some degree of a heat resistance. Furthermore, the thermal decomposition retention rates of resin compositions 8 and 9 in comparative examples 3 and 4 are 40 to 56% which is low while the contents of the LA monomer units in resin compositions 10 to 13 in comparative examples 5 to 8 are 0 mol % which is low and the thermal decomposition retention rates thereof are 38 to 40% which is low or difficult to measure. Thus, resin compositions 8 to 13 may readily cause reduction of molecular weights thereof due to heating in a molding process such as a kneading, pelletizing, or molding process, and degradation of the physical property of a molded product may be increased.

FIG. 1 is an arrangement of the relations among resin compositions 10 to 13 in comparative examples 5 to 8 in Table 3 and indicates the relation between the mole fractions (%) of valeric acid monomer units (3HV) in the resin compositions containing no lactic acid monomer unit (LA) and the deflection temperatures of the resin compositions under load. As indicated in FIG. 1, it is found that there is a good correlation between the deflection temperature of a 3HB-3HV copolymer under load and the molar ratio (%) of valeric acid monomer units (3HV) therein. Furthermore, it is found that the molar ratio of 3HV is preferably 25% or less.

PRACTICAL EXAMPLE 6

<Manufacturing of Polyester 14>
A culture medium provided by using and cultivating bacillus on a medium containing 5.0 g/l of peptone, 5.0 g/l of yeast extract, and 5.0 g/l of meat extract for 16 hours was subjected to cultivation at 45° C. for 48 hours on a minimal medium (containing glucose) with limited amounts of nitrogen sources to which propionic acid was added, so that cultivated bacteria containing a polyester were obtained. The obtained cultivated bacteria were lyophilized and chloroform was added to extract intracellular substances. After insoluble components were filtered out, methanol was added into a filtrate to precipitate a bacterial extract again and filtration was made again to obtain a purified bacteria-yielded product. The bacteria-yielded product was treated with an alkaline and warm water and accordingly hydrolyzed to reduce the molecular weight thereof, so that polyester 14 was provided. As polyester 14 was subjected to an NMR analysis, a polyester (P-3HB-co-3HV) was identified whose containment ratio (molar ratio) of 3-hydroxybutyric acid monomer units (3HB) and 3-hydroxyvaleric acid monomer units (3HV) was 83:17.

<Manufacturing of Lactic Acid Copolymer 14>
Then, 0.05 g/l of polyester 14, 0.95 g/l of lactic acid, and 0.1 g/l of tin octoate were added into an anhydrous toluene solution, stirred at 130° C. in nitrogen atmosphere for 24 hours, and subsequently, further left as it stood at 130° C. for 24 hours. After it was held in a vacuum for 1 hour and returned at room temperature, an obtained product was dissolved in chloroform and methanol and hexane were added to filter and recover a precipitate. The dissolution, precipitation, and filtration were repeated for purification, and finally, vacuum drying was conducted to obtain a purified product. The obtained purified product was subjected to an NMR analysis and identified to be a lactic acid copolymer (Co-PLA) which was referred to as lactic acid copolymer 14. The containment ratio (molar ratio) of L-lactic acid monomer units (LLA), 3-hydroxybutyric acid monomer units (3HB), and 3-hydroxyvaleric acid monomer units (3HV) of lactic acid copolymer 14 was 95:4:1. Furthermore, the weight average molecular weight (MW) of lactic acid copolymer 14 based on a GPC method was 171,000 as a standard polystyrene equivalent value.

<Manufacturing of Resin Composition 14>
0.5 parts by weight of thermal stabilizer 1, 0.5 parts by weight of thermal stabilizer 2, and 0.5 parts by weight of an anti-hydrolyzing agent were added to 100 parts by weight of the above-mentioned lactic acid copolymer 14 and molten and kneaded at a temperature of 180° C. by a uniaxial kneading extruder to manufacture a pellet with sides of about 3 mm for molding. Then, the manufactured pellet was dried at 50° C. by using a multi-deck hot air dryer for 12 hours to provide resin composition 14. Herein, used thermal stabilizer 1 was a tetraester-type hindered phenol compound (AO-60 produced by ADEKA corporation) and thermal stabilizer 2 was bis(2, 6-di-tert-butyl-4-methylphenyl)pentaerythritol-diphosphite (PEP-36 produced by ADEKA Corporation) while the anti-hydrolyzing agent was a carbodiimide-modified isocyanate compound (Carbodilite LA-1 produced by Nisshinbo Holdings Inc.).

<Measurement of Deflection Temperature of Resin Composition 14 Under Load>
Resin composition 14 was subjected to injection molding by using an electrically-driven injection molding machine with a mold clamping pressure of 50 tons and setting a mold temperature of 80° C., a cylinder temperature of 180° C., an injection speed of 20 mm/s, an injection pressure of 100 MPa, and a cooling time period of 30 sec. A molded product was subjected to primary annealing at 80° C. for 15 minutes and secondary annealing at 60° C. for 12 hours to provide a strip specimen for testing a defection temperature under load. The sizes of the manufactured strip specimen had a length of 130 mm, a width of 3.2 mm, and a height of 12.7 mm. A test of a deflection temperature under load was conducted in accordance with JIS K 7191-2 (1996). Additionally, a supporting point distance, a temperature rising rate, and a bending stress were 100 mm, 2° C./min, and 1.08 MPa, respectively. The deflection temperature of resin composition 14 under load was 82° C.

<Measurement of Thermal Decomposition Retention Rate of Resin Composition 14>
1 g of resin composition 14 was placed on a hot plate and heated at 200° C. for 10 minutes. Each of the weight average molecular weights (MW) of resin composition 14 before heating and after heating thereof was measured based on a GPC method and the thermal decomposition retention rate (%) thereof was calculated by using the following formula:

(Thermal decomposition retention rate)={(MW before heating)−(MW after heating)}/(MW before heating)×100.

The thermal decomposition retention rate of resin composition 14 was 97%.

The above-mentioned composition and properties of resin composition 14 are summarized and indicated in the column of practical example 6 in Table 4. Herein, the copolymerization ratios in Table 4 are molar ratios of 3HB, 3HV, and LA in lactic acid copolymer 14.

PRACTICAL EXAMPLE 7

<Manufacturing of Polyester 15>
Polyester 15 whose containment ratio (molar ratio) of 3-hydroxybutyric acid monomer units (3HB) and 3-hydroxyvaleric acid monomer units (3HV) was 92:8 was manufactured similarly to practical example 6 except that the cultivation condition of the bacillus medium and the hydrolysis condition of the obtained bacteria-yielded products were modified in <manufacturing of polyester 14> of practical example 6.

<Manufacturing of lactic acid copolymer 15 and resin composition 15>

A purified product was obtained similarly to practical example 6 except that 0.2 g/l of polyester 15, 0.8 g/l of L-lactic acid, and 0.1 g/l of tin octoate were added instead of addition of 0.05 g/l of polyester 14, 0.95 g/l of L-lactic acid, and 0.1 g/l of tin octoate in <manufacturing of lactic acid copolymer 14> of practical example 6. The obtained purified product was subjected to an NMR analysis and identified to be a lactic acid copolymer (Co-PLA) which was referred to as lactic acid copolymer 15. The containment ratio (molar ratio) of L-lactic acid monomer units (LLA), 3-hydroxybutyric acid monomer units (3HB), and 3-hydroxyvaleric acid monomer units (3HV) of lactic acid copolymer 15 was 81:18:1. Furthermore, the weight average molecular weight (MW) of lactic acid copolymer 15 based on a GPC method was 454,000 as a standard polystyrene equivalent value. The thermal stabilizers and the anti-hydrolyzing agent were added to lactic acid copolymer 15 similarly to <manufacturing of resin composition 14> in practical example 6 to manufacture resin composition 15.

<Measurement of Deflection Temperature Under Load and Thermal Decomposition Retention Rate of Resin Composition 15>

The deflection temperature under load and thermal decomposition retention rate of resin composition 15 were measured similarly to practical example 6 and the results of the measurement are indicated together with the composition of resin composition 15 and the like in the column of practical example 7 in Table 4 similarly to practical example 6.

PRACTICAL EXAMPLE 8

<Manufacturing of Polyester 16>

Polyester 16 whose containment ratio (molar ratio) of 3-hydroxybutyric acid monomer units (3HB) and 3-hydroxyvaleric acid monomer units (3HV) was 97:3 was manufactured similarly to practical example 6 except that the cultivation condition of the bacillus medium and the hydrolysis condition of the obtained bacteria-yielded products were modified in <manufacturing of polyester 14> of practical example 6.

<Manufacturing of Lactic Acid Copolymer 16 and Resin Composition 16>

A purified product was obtained similarly to practical example 6 except that 0.3 g/l of polyester 16, 0.7 g/l of L-lactic acid, and 0.1 g/l of tin octoate were added instead of addition of 0.05 g/l of polyester 14, 0.95 g/l of L-lactic acid, and 0.1 g/l of tin octoate in <manufacturing of lactic acid copolymer 14> of practical example 6. The obtained purified product was subjected to an NMR analysis and identified to be a lactic acid copolymer (Co-PLA) which was referred to as lactic acid copolymer 16. The containment ratio (molar ratio) of L-lactic acid monomer units (LLA), 3-hydroxybutyric acid monomer units (3HB), and 3-hydroxyvaleric acid monomer units (3HV) of lactic acid copolymer 16 was 31:67:2. Furthermore, the weight average molecular weight (MW) of lactic acid copolymer 16 based on a GPC method was 65,000 as a standard polystyrene equivalent value. The thermal stabilizers and the anti-hydrolyzing agent were added to lactic acid copolymer 16 similarly to <manufacturing of resin composition 14> in practical example 6 to manufacture resin composition 16.

<Measurement of Deflection Temperature Under Load and Thermal Decomposition Retention Rate of Resin Composition 16>

The deflection temperature under load and thermal decomposition retention rate of resin composition 16 were measured similarly to practical example 6 and the results of the measurement are indicated together with the composition of resin composition 16 and the like in the column of practical example 8 in Table 1 similarly to practical example 6.

PRACTICAL EXAMPLE 9

<Manufacturing of Polyester 17>

Polyester 17 whose containment ratio (molar ratio) of 3-hydroxybutyric acid monomer units (3HB) and 3-hydroxyvaleric acid monomer units (3HV) was 85:15 was manufactured similarly to practical example 6 except that the cultivation condition of the bacillus medium and the hydrolysis condition of the obtained bacteria-yielded products were modified in <manufacturing of polyester 14> of practical example 6.

<Manufacturing of Lactic Acid Copolymer 17 and Resin Composition 17>

A purified product was obtained similarly to practical example 6 except that 0.2 g/l of polyester 17, 0.8 g/l of L-lactic acid, and 0.1 g/l of tin octoate were added instead of addition of 0.05 g/l of polyester 14, 0.95 g/l of L-lactic acid, and 0.1 g/l of tin octoate in <manufacturing of lactic acid copolymer 14> of practical example 6. The obtained purified product was subjected to an NMR analysis and identified to be a lactic acid copolymer (Co-PLA) which was referred to as lactic acid copolymer 17. The containment ratio (molar ratio) of L-lactic acid monomer units (LLA), 3-hydroxybutyric acid monomer units (3HB), and 3-hydroxyvaleric acid monomer units (3HV) of lactic acid copolymer 17 was 80:17:3. Furthermore, the weight average molecular weight (MW) of lactic acid copolymer 17 based on a GPC method was 719,000 as a standard polystyrene equivalent value. The thermal stabilizers and the anti-hydrolyzing agent were added to lactic acid copolymer 17 similarly to <manufacturing of resin composition 14> in practical example 6 to manufacture resin composition 17.

<Measurement of Deflection Temperature Under Load and Thermal Decomposition Retention Rate of Resin Composition 17>

The deflection temperature under load and thermal decomposition retention rate of resin composition 17 were measured similarly to practical example 6 and the results of the measurement are indicated together with the composition of resin composition 17 and the like in the column of practical example 9 in Table 4 similarly to practical example 6.

PRACTICAL EXAMPLE 10

<Manufacturing of Resin Composition 18>

Resin composition 18 was manufactured similarly to <manufacturing of lactic acid copolymer 14> of practical example 6 except that 0.5 parts by weight of each of crystallization nucleating agent 1 (a talc-type nucleating agent: PPA-Zn produced by Nissan Chemical Industries, Ltd.), crystallization nucleating agent 2 (a nucleating agent composed of a metal salt-type material having a phenyl group: SG-2000 produced by Nippon Talc Co., Ltd.), and crystallization nucleating agent 3 (a benzoyl compound-type nucleating agent; T-1287N produced by ADEKA Corporation) as crystallization nucleating agents was added to 100 parts by weight of lactic acid copolymer 14 together with addition of the thermal stabilizers and the anti-hydrolyzing agent in <manufacturing of lactic acid copolymer 14> of practical example 6.

<Measurement of Deflection Temperature Under Load and Thermal Decomposition Retention Rate of Resin Composition 18>

The deflection temperature under load and thermal decomposition retention rate of resin composition 18 were measured similarly to practical example 6 and the results of the measurement are indicated together with the composition of resin composition 18 and the like in the column of practical example 10 in Table 4 similarly to practical example 6.

COMPARATIVE EXAMPLE 9

<Preparation and Measurement of Deflection Temperature Under Load of Resin Composition 19>

Resin composition 19 was manufactured similarly to <manufacturing of lactic acid copolymer 1> of practical example 1 except that a commercially available poly(L-lactic acid) (LACEA H-100 produced by Mitsui Chemicals) was used instead of lactic acid copolymer 14 in <manufacturing of resin composition 14> of practical example 6. The deflection temperature of resin composition 19 under load was measured similarly to practical example 6 and the results of the measurement are indicated together with the composition of resin composition 19 and the like in the column of comparative example 9 in Table 5.

COMPARATIVE EXAMPLE 10

<Manufacturing of Resin Composition 20>

Polyester 20 whose containment ratio (molar ratio) of 3-hydroxybutyric acid monomer units (3HB) and 3-hydroxyvaleric acid monomer units (3HV) was 92:8 was manufactured by adjusting the cultivation condition of the bacillus medium in <manufacturing of polyester 14> of practical example 6. The weight average molecular weight (MW) of polyester 20 based on a GPC method was 1,200,000 as a standard polystyrene equivalent value. The thermal stabilizers and the anti-hydrolyzing agent were added to polyester 20 to manufacture resin composition 20 similarly to <manufacturing of resin composition 14> of practical example 6.

<Measurement of Deflection Temperature Under Load and Thermal Decomposition Retention Rate of Resin Composition 20>

The deflection temperature under load and thermal decomposition retention rate of resin composition 20 were measured similarly to practical example 6 and the results of the measurement are indicated together with the composition of resin composition 20 and the like in the column of comparative example 10 in Table 5 similarly to comparative example 6.

COMPARATIVE EXAMPLE 11

<Manufacturing of Resin Composition 21>

Polyester 20 in comparative example 8 was hydrolyzed by an alkaline and warm water to reduce the molecular weight thereof so that polyester 21 was manufactured.

<Manufacturing of Lactic Acid Copolymer 21 and Resin Composition 21>

A purified product was obtained similarly to practical example 6 except that 0.8 g/l of polyester 21, 0.2 g/l of L-lactic acid, and 0.1 g/l of tin octoate were added instead of addition of 0.05 g/l of polyester 14, 0.95 g/l of L-lactic acid, and 0.1 g/l of tin octoate in <manufacturing of lactic acid copolymer 14> of practical example 6. The obtained purified product was subjected to an NMR analysis and identified to be a lactic acid copolymer (Co-PLA) which was referred to as lactic acid copolymer 21. The containment ratio (molar ratio) of L-lactic acid monomer units (LLA), 3-hydroxybutyric acid monomer units (3HB), and 3-hydroxyvaleric acid monomer units (3HV) of lactic acid copolymer 21 was 20:74:6. Furthermore, the weight average molecular weight (MW) of lactic acid copolymer 21 based on a GPC method was 56,000 as a standard polystyrene equivalent value. No additive such as a thermal stabilizer or an anti-hydrolyzing agent was added to lactic acid copolymer 21 and kneading, pelletizing, and drying thereof were made directly, similarly to <manufacturing of resin composition 14> in practical example 6 to provide resin composition 21.

<Measurement of Deflection Temperature Under Load and Thermal Decomposition Retention Rate of Resin Composition 21>

The deflection temperature under load and thermal decomposition retention rate of resin composition 21 were measured similarly to practical example 7 and the results of the measurement are indicated together with the composition of resin composition 21 and the like in the column of comparative example 11 in Table 5 similarly to comparative example 6.

COMPARATIVE EXAMPLE 12

<Manufacturing of Resin Composition 22>

Resin composition 22 was manufactured similarly to <manufacturing of resin composition 14> of practical example 6 except that lactic acid copolymer 21 prepared in comparative example 10 was provided instead of lactic acid copolymer 14 in practical example 6.

<Measurement of Deflection Temperature of Resin Composition 22 Under Load>

The deflection temperature of resin composition 22 under load was measured similarly to practical example 6 and the results of the measurement are indicated together with the composition of resin composition 22 and the like in the column of comparative example 12 in Table 5.

The compositions and properties of resin compositions 14 to 22 in the above-mentioned practical examples 6 to 10 and comparative examples 9 to 12 are indicated in Table 4 and Table 5, respectively. Herein, the evaluation results in the following tables indicate that "A" is particularly excellent for a raw material of a resin molded product and "B" is difficult to use directly. Furthermore, "n.d." indicates that measurement is not possible or measurement has not yet been conducted.

TABLE 4

|  |  |  | Practical example 6 | Practical example 7 |
|---|---|---|---|---|
| Formulation and property of resin composition | Copolymerization ratio (mol %) | 3HB | 4 | 18 |
|  |  | 3HV | 1 | 1 |
|  |  | LA | 95 | 81 |
|  | Thermal stabilizer 1 (wt %) |  | 0.5 | 0.5 |
|  | Thermal stabilizer 2 (wt %) |  | 0.5 | 0.5 |
|  | Anti-hydrolyzing agent (wt %) |  | 0.5 | 0.5 |
|  | Crystallization nucleating agent 1 (wt %) |  |  |  |
|  | Crystallization nucleating agent 2 (wt %) |  |  |  |
|  | Crystallization nucleating agent 3 (wt %) |  |  |  |
|  | Weight-average molecular weight (×10$^4$) |  | 17.1 | 45.4 |

TABLE 4-continued

|  |  | | |
|---|---|---|---|
| Deflection temperature under load (° C.) | | 82 | 74 |
| Thermal decomposition retention rate (%) | | 97 | 90 |
| Evaluation | | A | A |

| | | | Practical example 8 | Practical example 9 | Practical example 10 |
|---|---|---|---|---|---|
| Formulation and property of resin composition | Copolymerization ratio (mol %) | 3HB | 67 | 17 | 4 |
| | | 3HV | 2 | 3 | 1 |
| | | LA | 31 | 80 | 95 |
| | Thermal stabilizer 1 (wt %) | | 0.5 | 0.5 | 0.5 |
| | Thermal stabilizer 2 (wt %) | | 0.5 | 0.5 | 0.5 |
| | Anti-hydrolyzing agent (wt %) | | 0.5 | 0.5 | 0.5 |
| | Crystallization nucleating agent 1 (wt %) | | | | 0.5 |
| | Crystallization nucleating agent 2 (wt %) | | | | 0.5 |
| | Crystallization nucleating agent 3 (wt %) | | | | 0.5 |
| | Weight-average molecular weight (×10⁴) | | 6.5 | 71.9 | 17.1 |
| | Deflection temperature under load (° C.) | | 88 | 71 | 84 |
| | Thermal decomposition retention rate (%) | | 82 | 89 | 98 |
| | Evaluation | | A | A | A |

TABLE 5

| | | | Comparative example 9 | Comparative example 10 |
|---|---|---|---|---|
| Formulation and property of resin composition | Copolymerization ratio (mol %) | 3HB | 0 | 92 |
| | | 3HV | 0 | 8 |
| | | LA | 100 | 0 |
| | Thermal stabilizer 1 (wt %) | | 0.5 | 0.5 |
| | Thermal stabilizer 2 (wt %) | | 0.5 | 0.5 |
| | Anti-hydrolyzing agent (wt %) | | 0.5 | 0.5 |
| | Weight-average molecular weight (×10⁴) | | 15 | 120 |
| | Deflection temperature under load (° C.) | | 56 | 88 |
| | Thermal decomposition retention rate (%) | | n.d. | 38 |
| | Evaluation | | B | B |

| | | | Comparative example 11 | Comparative example 12 |
|---|---|---|---|---|
| Formulation and property of resin composition | Copolymerization ratio (mol %) | 3HB | 74 | 74 |
| | | 3HV | 6 | 6 |
| | | LA | 20 | 20 |
| | Thermal stabilizer 1 (wt %) | | | 0.5 |
| | Thermal stabilizer 2 (wt %) | | | 0.5 |
| | Anti-hydrolyzing agent (wt %) | | | 0.5 |
| | Weight-average molecular weight (×10⁴) | | 5.6 | 5.6 |
| | Deflection temperature under load (° C.) | | 85 | 86 |

TABLE 5-continued

| | | |
|---|---|---|
| Thermal decomposition retention rate (%) | 48 | 63 |
| Evaluation | B | B |

The deflection temperatures of resin compositions 14 to 18 in practical examples 6 to 10 under load were 71 to 88° C. which is 65° C. or higher, whereby it is possible to maintain a mechanical strength in usage environment at a usually envisaged high temperature and it is possible to be available for many applications as general purpose resin molded products such as housings of electric or electronic instruments. Furthermore, the thermal decomposition retention rates of resin compositions 14 to 18 are 82% or higher which is sufficiently higher than 80% required in a normal molding process, whereby a heat resistance is maintained or hardly degraded against heating in a molding process such an injection molding process and it is possible to provide a preferable resin composition which is available for many applications as a resin molded products.

The properties of resin compositions 14 to 22 in practical examples 6 to 10 and comparative examples 9 to 12 will be described specifically.

In resin compositions 14 to 18 in practical examples 6 to 10 which are copolymer resin compositions according to an embodiment of the present invention, the contents of lactic acid (LA) monomer units in lactic acid copolymers 14 to 18 are in a range of 30 to 95 mol %. Furthermore, the weight average molecular weights (MW) of lactic acid copolymers 14 to 18 are in a range of 65,000 to 719,000. Moreover, the deflection temperatures of resin compositions 14 to 18 under load are 71 to 88° C. at a comparatively high load of 1.8 MPa which temperatures are high whereby it is possible to retain the mechanical strength of a molded product sufficiently even at a high temperature envisaged for a usual and general purpose molded product. Furthermore, the thermal decomposition retention rates thereof are 82 to 98% which is high, whereby reduction of the molecular weight is hardly caused even against heating in a molding process such as a kneading, pelletizing or molding process and it is possible to obtain a molded product with a little influence of a physical property change, deformation, or shrinkage in a molding process. Additionally, as practical example 10 is compared with practical example 6, there was a difference with respect to presence or absence of the crystallization nucleating agents but there was no difference between the deflection temperatures thereof under load. It is considered that this is because annealing was conducted in manufacturing a test piece for testing the deflection temperature under load whereby crystallization in practical example 6 also proceeded sufficiently. It is considered that if annealing were not conducted in manufacturing the test piece for testing the defection temperature under load, a result of a deflection temperature under load in practical example 10 which was higher than that of practical example 6 would be obtained, although it is not indicated in the practical examples.

On the other hand, resin composition 19 in comparative example 9 is a polylactic acid resin but the deflection temperature thereof under load was 56° C. which was a low value, even if sufficient annealing was conducted, as was known conventionally. Furthermore, as indicated in comparative examples 11 and 12, the thermal decomposition retention rates of the lactic acid copolymers in which the contents of the LA monomer units were 20% and 35% in the 3HB-3HV copolymer (practical example 2) were 48% and 56%, respectively, which was too low to be used as a resin for molding.

Moreover, as indicated in comparative examples 10 and 12, the thermal decomposition retention rate of the lactic acid copolymer in which the content of the LA monomer units in the 3HB-3HV copolymer was 20% was not sufficiently improved, even when the two kinds of thermal stabilizers and the anti-hydrolyzing agent were added thereto, and it was not usable as a resin for molding.

Additionally, as indicated in comparative example 3, the thermal decomposition retention rate of the lactic acid copolymer with a LA monomer unit content of 35% was 56% which was slightly low, when the thermal stabilizers and the anti-hydrolyzing agent were not added thereto, while as indicated in practical example 8, the thermal decomposition retention rate of the lactic acid copolymer with a LA monomer unit content of 31% was 82% due to addition of the thermal stabilizers and the anti-hydrolyzing agent, which was excellent as a resin for molding.

It is possible to utilize a copolymer resin composition according to an embodiment of the present invention for various kinds of general-purpose resin molded product. In particular, it is possible to provide preferable utilization for a resin component such as a housing to be used for an image output instrument such as a copying machine or a printer or an electric or electronic instrument such as a home electric appliance. Although various environments are provided for use or storage of an electric or electronic instrument, an automobile component, or the like, many of instruments to be used in a house or office generally are ensured in a use or storage environment at about 60° C. A deflection temperature under load for a molded product composed of a copolymer resin composition according to an embodiment of the present invention is 60° C. or higher and preferably 65° C. or higher and installation thereof in an electric or electronic instrument, an automobile component, or the like is conducted whereby it is possible to make use thereof without a deformation even in an environment in which use thereof is made practically.

Figure 2:
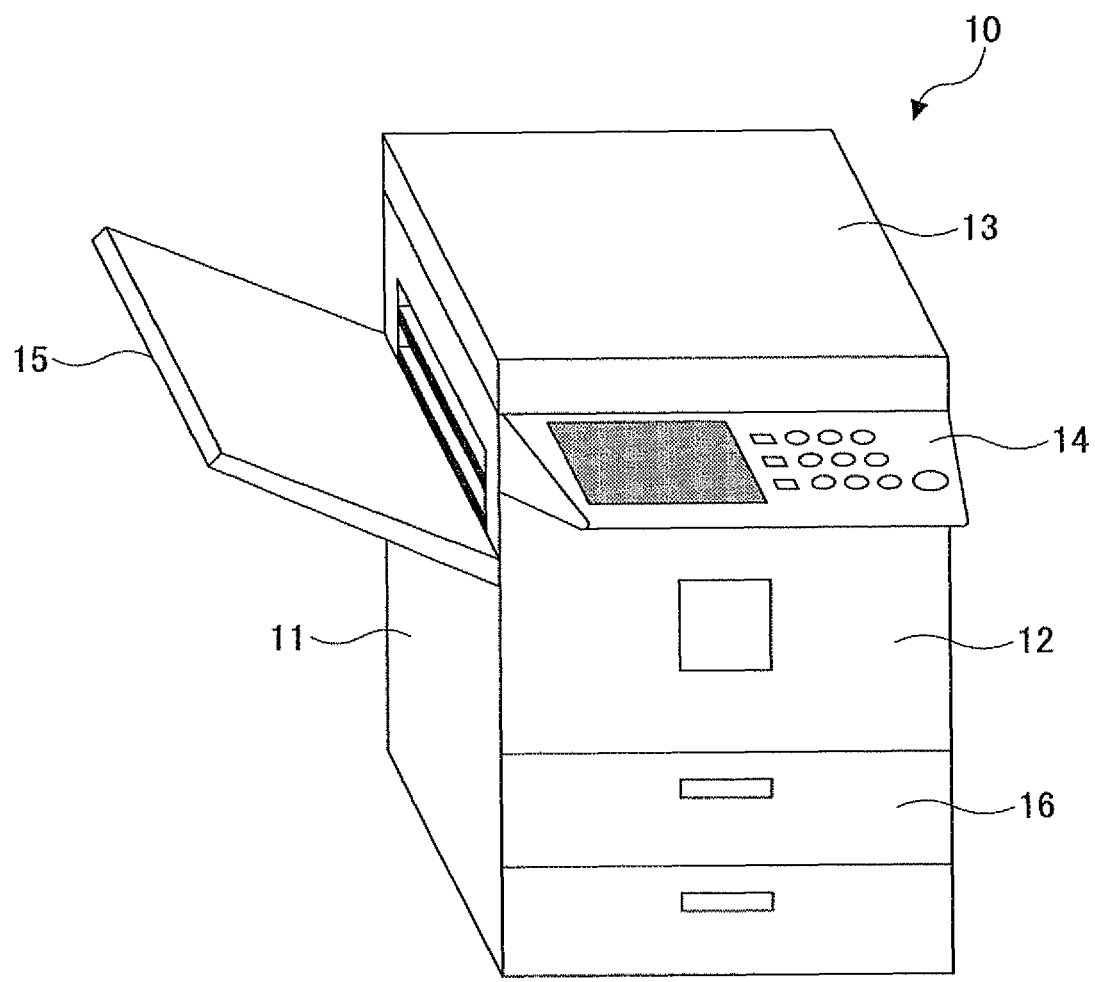
FIG. 2 is an illustrative perspective view of an image forming apparatus including a molded product for which a copolymer resin composition according to an embodiment of the present invention has been utilized.

For example, it is possible to provide a preferable use thereof for not only a housing 11, front panel 12, top panel 13, control panel 14, paper ejection tray 15, and paper feed tray 16 of an image forming apparatus 10 as illustrated in the perspective view of FIG. 2 but also various kinds of resin products which are not illustrated in the figure inside an image forming apparatus or the like.

Furthermore, a copolymer resin composition according to an embodiment of the present invention whose raw material is obtained from a biomass material has biodegradability, and hence, also provides an excellent product from the view points of an environmental problem and a resource problem.

APPENDIX

Typical embodiments (1) to (13) of the present invention will be described below.

Embodiment (1): A copolymer resin composition characterized by including a lactic acid copolymer which contains monomer units represented by the following chemical formulas [1], [2], and [3],

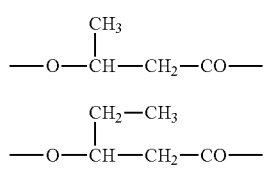

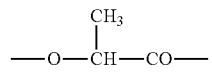

wherein a content of a monomer unit represented by the chemical formula [3] is 50 mol % or more and 95 mol % or less and a weight-average molecular weight thereof is 20,000 or more and 1,000,000 or less, and wherein a deflection temperature thereof under load is 65° C. or higher and 100° C. or lower at a bending stress of 1.80 MPa.

Embodiment (2): A copolymer resin composition characterized by including a lactic acid copolymer which contains monomer units represented by the following chemical formulas [1], [2], and [3],

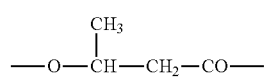

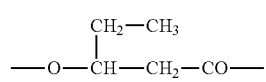

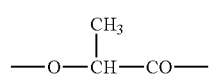

wherein a content of a monomer unit represented by the chemical formula [3] is 30 mol % or more and 95 mol % or less and a weight average molecular weight thereof is 20,000 or more and 1,000,000 or less, and a thermal stabilizer and/or an anti-hydrolyzing agent.

Embodiment (3): The copolymer resin composition as described in embodiment (2) above, characterized in that the thermal stabilizer includes at least either one of a phenol-type antioxidant and a phosphate-type antioxidant.

Embodiment (4): The copolymer resin composition as described in any one of embodiments (1) to (3) above, characterized in that a molar ratio of a monomer unit represented by the chemical formula [1] and a monomer unit represented by the chemical formula [2] in the lactic acid copolymer is in a range of 99:1 to 75:25.

Embodiment (5): The copolymer resin composition as described in any one of embodiments (1) to (4) above, characterized in that a thermal decomposition retention rate of the lactic acid copolymer is 80% or more.

Embodiment (6): The copolymer resin composition as described in any one of embodiments (1) to (5) above, characterized in that a monomer unit represented by the chemical formula [3] is either an L-lactic acid monomer unit or a D-lactic acid monomer unit.

Embodiment (7): The copolymer resin composition as described in any one of embodiments (1) to (6) above, characterized by further including a crystallization nucleating agent.

Embodiment (8): The copolymer resin composition as described in embodiment (7) above, characterized in that the crystallization nucleating agent is composed of one or more selected from talc-type nucleating agents, nucleating agents composed of a metal salt-type material having a phenyl group, and benzoyl compound-type nucleating agents.

Embodiment (9): A molded product characterized in that the copolymer resin composition as described in embodiment (7) or (8) above is molded by a method of injection molding while a mold temperature is 50° C. or higher and 90° C. or lower.

Embodiment (10): A method of manufacturing a copolymer resin composition characterized by including a polyester yielding step of yielding a polyester containing a 3-hydroxybutyric acid monomer unit and a 3-hydroxyvaleric acid monomer unit by a microbial fermentation method, a lactic acid copolymer manufacturing step of adding a lactic acid to the polyester to an extent that a monomer unit ratio thereof is 50 mol % or more and 95% or less, so as to manufacture a lactic acid copolymer with a weight-average molecular weight of 20,000 or more and 1,000,000 or less, and a nucleating agent adding step of adding a nucleating agent to the lactic acid copolymer to provide a copolymer resin composition whose deflection temperature under load is 65° C. or higher and 100° C. or lower at a bending stress of 1.80 MPa.

Embodiment (11): A method of manufacturing a copolymer resin composition characterized by including a polyester yielding step of yielding a polyester containing a 3-hydroxybutyric acid monomer unit and a 3-hydroxyvaleric acid monomer unit by a microbial fermentation method, a lactic acid copolymer manufacturing step of adding a lactic acid to the polyester to an extent that a monomer unit ratio thereof is 30 mol % or more and 95% or less, so as to manufacture a lactic acid copolymer with a weight-average molecular weight of 20,000 or more and 1,000,000 or less, and a additive adding step of adding a thermal stabilizer and/or an anti-hydrolyzing agent to the lactic acid copolymer.

Embodiment (12): The method of manufacturing a copolymer resin composition as described in embodiment (11) above, characterized in that the thermal stabilizer includes at least either of a phenol-type antioxidant or a phosphate-type antioxidant.

Embodiment (13): The method of manufacturing a copolymer resin composition as described in any one of embodiments (10) to (12) above, characterized in that a molar ratio of a 3-hydroxybutyric acid monomer unit and a 3-hydroxyvaleric acid monomer unit in the polyester is in a range of 99:1 to 75:25.

Although the illustrative embodiment(s) and/or specific example(s) of the present invention has/have been described above with reference to the accompanying drawing(s), the present invention is not limited to any of the illustrative embodiment(s) and/or specific example(s) and the illustrative embodiment(s) and specific example(s) may be altered, modified, or combined without departing from the scope of the present invention.

The present application claims the benefit of its priorities based on Japanese Patent Application No. 2009-159981 filed on Jul. 6, 2009 in Japan, Japanese Patent Application No. 2009-159982 filed on Jul. 6, 2009 in Japan, and Japanese Patent Application No. 2010-052398 filed on Mar. 9, 2010 in Japan, the entire contents of which are herein incorporated by reference.

What is claimed is:
1. A copolymer resin composition comprising:
a lactic acid copolymer, the lactic acid copolymer containing monomer units represented by the following chemical formulas [1], [2], and [3],

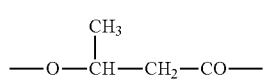 [1]

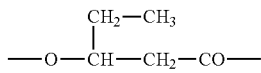 [2]

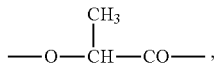 [3]

wherein
a content of a monomer unit represented by the chemical formula [1] is 4 mol %,
a content of a monomer unit represented by the chemical formula [2] is 1 mol %,
a content of a monomer unit represented by the chemical formula [3] is 95 mol %,
a weight-average molecular weight of the lactic acid copolymer is 20,000 or more and 1,000,000 or less, and
a deflection temperature of the lactic acid copolymer under load is 65° C. or higher and 100° C. or lower at a bending stress of 1.80 MPa; and
the copolymer resin composition further comprising a crystallization nucleating agent,
wherein the crystallization nucleating agent comprises at least one of nucleating agents composed of a metal salt-type material having a phenyl group and benzoyl-type nucleating agents.

2. The copolymer resin composition as described in claim 1, wherein a thermal decomposition retention rate of the lactic acid copolymer is 80% or more.

3. A molded product, comprising the copolymer resin composition as claimed in claim 1, wherein the resin composition is molded by a method of injection molding within a mold temperature of 50° C. or higher and 90° C. or lower.

4. A copolymer resin composition comprising:
A lactic acid copolymer, the lactic acid copolymer containing monomer units represented by the following chemical formulas [1], [2], and [3],

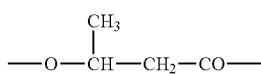 [1]

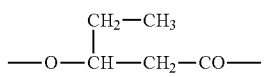 [2]

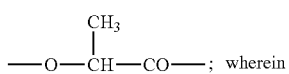 [3]

wherein
a content of a monomer unit represented by the chemical formula [3] is 50 mol % or more and 95 mol % or less; and
a deflection temperature of the lactic acid copolymer under load is 65° C. or higher and 100° C. or lower at bending stress of 1.80 MPa, and
wherein a molar ratio of a monomer unit represented by the chemical formula [1] and a monomer unit represented by the chemical formula [2] in the lactic acid copolymer is in a range of 99:1 to 75:25, and
wherein the weight-average molecular weight of the lactic acid copolymer is 50,000 or higher and 800,000 or less.

5. The copolymer resin composition as described in claim 4, wherein a thermal decomposition retention rate of the lactic acid copolymer is 80% or more.

6. The copolymer resin composition as described in claim 4, wherein a monomer unit represented by the chemical formula [3] is either of an L-lactic acid monomer unit or a D-lactic acid monomer unit.

7. The copolymer resin composition s described in claim 4, further comprising a crystallization nucleating agent.

8. The copolymer resin composition as described in claim 7 wherein the crystallization nucleating agent is composed of one or more selected from talc-type nucleating agents, nucleating agents composed of a metal salt-type material having a phenyl group, and benzoyl-type nucleating agents.

9. A molded product, comprising the copolymer resin composition as claimed in claim 7, wherein the resin composition is molded by a method of injection molding within a mold temperature of 50° C. or higher and 90° C. or lower.

10. The copolymer resin composition as described in claim 4, further comprising a thermal stabilizer and/or an anti-hydrolyzing agent.

11. The copolymer resin composition as described in claim 7, wherein the thermal stabilizer comprises at least either one of a phenol-type antioxidant and a phosphate-type antioxidant, 12. The copolymer resin composition as described in claim 4, further comprising a talc-type nucleating agent, a nucleating agent composed of a metal salt-type material having a phenyl group, and a benzoyl-type nucleating agent.

13. The copolymer resin composition as described in claim 4, further comprising a phenol-type antioxidant and a phosphate-type antioxidant.

14. The copolymer resin composition as described in claim 4, further comprising a phenol-type antioxidant, a phosphate-type antioxidant, and a carbodiimide compound-type anti-hydrolyzing agent.

15. The copolymer resin composition as described in claim 4, wherein the weight-average molecular weight of the lactic acid copolymer is 70,000 or higher and 800,000 or less.

16. The copolymer resin composition as described in claim 4, wherein a content of a monomer unit represented by the chemical formula [1] is about 4 mol %, a content of a monomer unit represented by the chemical formula [2] is about 1 mol %, and a content of a monomer unit represented by the chemical formula [3] is about 95 mol %.

* * * * *